(12) United States Patent
Johnson et al.

(10) Patent No.: US 9,965,623 B2
(45) Date of Patent: May 8, 2018

(54) SECURING ACCESSIBLE SYSTEMS USING BASE FUNCTION ENCODING

(71) Applicant: IRDETO CANADA CORPORATION, Ottawa (CA)

(72) Inventors: Harold Johnson, Ottawa (CA); Yuan Xiang Gu, Ottawa (CA); Michael Wiener, Ottawa (CA); Yongxin Zhou, Mequon, WI (US)

(73) Assignee: IRDETO B.V., LS Hoofddorp (NL)

( * ) Notice: Subject to any disclaimer, the term of this patent is extended or adjusted under 35 U.S.C. 154(b) by 285 days.

(21) Appl. No.: 14/389,361

(22) PCT Filed: Mar. 28, 2013

(86) PCT No.: PCT/CA2013/000305
§ 371 (c)(1),
(2) Date: Sep. 29, 2014

(87) PCT Pub. No.: WO2013/142981
PCT Pub. Date: Oct. 3, 2013

(65) Prior Publication Data
US 2015/0082425 A1    Mar. 19, 2015

Related U.S. Application Data

(60) Provisional application No. 61/617,991, filed on Mar. 30, 2012, provisional application No. 61/618,010, filed on Mar. 30, 2012.

(51) Int. Cl.
| | |
|---|---|
| *G06F 21/54* | (2013.01) |
| *G06F 21/14* | (2013.01) |
| *H04L 9/06* | (2006.01) |

(52) U.S. Cl.
CPC .............. *G06F 21/54* (2013.01); *G06F 21/14* (2013.01); *H04L 9/0618* (2013.01);
(Continued)

(58) Field of Classification Search
CPC . H04L 9/0693; H04L 9/0631; H04L 2209/04; H04L 2209/16; G06F 21/54; G06F 21/55; G06F 21/14
See application file for complete search history.

(56) References Cited

U.S. PATENT DOCUMENTS

| | | | | |
|---|---|---|---|---|
| 5,974,549 | A | * 10/1999 | Golan | G06F 9/468 714/47.3 |
| 6,088,452 | A | 7/2000 | Johnson et al. | |

(Continued)

FOREIGN PATENT DOCUMENTS

| | | |
|---|---|---|
| CN | 101088095 A | 12/2007 |
| CN | 101627394 A | 1/2010 |

(Continued)

OTHER PUBLICATIONS

Extended European Search Report cited in corresponding European Application No. 13768955.0 dated Oct. 9, 2015.
(Continued)

*Primary Examiner* — Catherine Thiaw
*Assistant Examiner* — Thomas Ho
(74) *Attorney, Agent, or Firm* — Rimon, P.C.; Marc Kaufman

(57) ABSTRACT

Systems and techniques for securing accessible computer-executable program code and systems are provided. One or more base functions may be generated and blended with existing program code, such that it may be difficult or impossible for a potential attacker to distinguish the base functions from the existing code. The systems and code also may be protected using a variety of other blending and protection techniques, such as fractures, variable dependent coding, dynamic data mangling, and cross-linking, which may be used individually or in combination, and/or may be blended with the base functions.

21 Claims, 25 Drawing Sheets

(52) U.S. Cl.
CPC ........ *H04L 9/0631* (2013.01); *H04L 2209/04* (2013.01); *H04L 2209/16* (2013.01)

(56) References Cited

U.S. PATENT DOCUMENTS

| | | | |
|---|---|---|---|
| 6,192,475 B1 | 2/2001 | Wallace | |
| 6,594,761 B1 | 7/2003 | Chow et al. | |
| 6,668,325 B1 | 12/2003 | Collberg et al. | |
| 6,779,114 B1 | 8/2004 | Gu et al. | |
| 6,842,682 B2 | 1/2005 | Chow et al. | |
| 6,842,862 B2 | 1/2005 | Chow et al. | |
| 7,350,085 B2 | 3/2008 | Johnson et al. | |
| 7,366,914 B2 | 4/2008 | Graunke | |
| 7,634,091 B2 | 12/2009 | Zhou et al. | |
| 2002/0092003 A1* | 7/2002 | Calder | G06F 21/126 717/138 |
| 2003/0163718 A1 | 8/2003 | Johnson et al. | |
| 2004/0139334 A1* | 7/2004 | Wiseman | G06F 21/51 713/188 |
| 2004/0139340 A1* | 7/2004 | Johnson | G06F 21/14 713/194 |
| 2004/0236955 A1 | 11/2004 | Chow et al. | |
| 2005/0166191 A1 | 7/2005 | Kandanchatha et al. | |
| 2005/0183072 A1 | 8/2005 | Horning et al. | |
| 2006/0136867 A1 | 6/2006 | Schneider et al. | |
| 2008/0016339 A1* | 1/2008 | Shukla | G06F 21/53 713/164 |
| 2008/0208560 A1* | 8/2008 | Johnson | G06F 21/14 703/22 |
| 2008/0216051 A1* | 9/2008 | Johnson | G06F 21/14 717/110 |
| 2011/0129084 A1* | 6/2011 | Fumaroli | G06F 21/75 380/28 |
| 2011/0214179 A1 | 9/2011 | Chow et al. | |
| 2011/0296192 A1 | 12/2011 | Hayashi et al. | |

FOREIGN PATENT DOCUMENTS

| | | |
|---|---|---|
| EP | 2009572 A1 | 12/2008 |
| EP | 1947584 B1 | 5/2009 |
| WO | 02095546 A2 | 11/2002 |
| WO | 2008101341 A1 | 8/2008 |
| WO | 2009108245 A2 | 9/2009 |

OTHER PUBLICATIONS

Extended European Search Report cited in corresponding European Application No. 13768730.7 dated Oct. 27, 2015.
Extended European Search Report cited in corresponding European Application No. 13767371.1 dated Feb. 5, 2016.
"Advanced Encryption Standard (AES)", Federal Information Processing Standard Publication 197, Nov. 26, 2001.
Prof Michael Backes: "Lecture Notes for CS-578 Cryptography (SS2007)", Nov. 25, 2011.
Alfred V. Aho, Ravi Sethi, Jefery D. Illman, Compliers: Principles, Techniques, and Tools. 1986, Addison-Wesley ISBN 0-201-100088-6.
K.E. Batcher, Sorting Networks and their Applications. Proc. AMPS Spring Joint Comput. Conf., vol. 32, pp. 307 314. 1968.
"Batcher Odd-even mergesort", accessed on Mar. 3, 2015, en.wikipedia.org/wiki/Batcher_odd-even_mergesort.
"Odd-even mergesort" accessed on Mar. 3, 2015, www.iti.fh-flensburg.de/lang/algorithmen/sortieren/networks/bemen.htm.
Keith Cooper, Timothy J. Harvey, and Ken Kennedy, A Simple, Fast Dominance Algorithm. Software Practice and Experience. 2001. No. 4, pp. 1-10.
Extended Euclidean Algorithm, Algorithm 2.107 on p. 67 in A.J. Menezcs, P.C. van Oorschot, S.A. Vanstone, Handbook of Applied Cryptography, CRC Press. 2001 (5th printing with corrections). Down-loadable from http://www.cacr.math.uwaterloo.ca/hac/.
National Institute of Standards and Technology (NIST), Advanced Encryption Standard (AES). FIPS Publication 197, Nov. 26, 2001. http://csrc.nist.gov/publications/fips/fips197/fips-197.pdf.
Alexander Klimov, Applications of T-Functions in Cryptography, PhD thesis under Adi Shamir, Weizmann Institute of Science, Oct. 2004. Theorem 5.3 p. 41.
Des, §7.4, pp. 250-259, in A.J. Menezes, P.C. van Oorschot . S.A. Vanstone, Handbook of Applied Cryptography. CRC Press, 2001 (5th printing with corrections). Downloadable from http://www.cacr.math.uwaterloo.ca/hac/.
Ronald L. Rivest, Permutation Polynomials Modulo $2\omega$. Finite Fields and their Applications, vol. 7, 2001 , pp. 287-292.
Ronald L. Rivest. Permutation Polynomials Modulo $2\omega$. Laboratory for Computer Science. MIT, Oct. 25, 1999.
A.J. Menezes, P.C. van Oorschot, S.A. Vanstone, Handbook of Applied Cryptography, §1.3. pp. 6 Hi. CRC Press, 2001 (5th printing with corrections). Downloadable from http://www.cacr.math.uwaterloo.ca/hac/.
Zhaopeng Dai et al, "The Single Cycle T-functions", National Basic Research Program of China, 2000.
Dexter Kozen, Susan Landau, Polynomial decomposition algorithms. J. Symb. Comp. 7(5)(1989), 445-456.
Medhu Sudan. Algebra and computation. MIT lecture notes. On line: http://people.csail.mit.edu/madhu/FT98/course.html.
James Xiao, Y. Zhou, Generating large non-singular matrices over an arbitrary field with block of full rank, 2002.
Kejian Xu, Zhaopeng Dai and Zongduo Dai the formulas of coefficients of sum and product of p-adic integers with applications to Witt vectors. Acta Arithmetica. 150 (2011). 361-384.
O. Billet. H. Gilbert, G. Ech-Chatbi, Cryptanalysis of a White Box AES Implementation, Proceedings of SAC 2004 Conference on Selected Areas in Cryptography, Aug. 2004, revised papers. Springer (LNCS 3357).
Stanley Chow. Yuan X. Gu, Harold Johnson, and Vladimir A. Zakharov, An Approach to the Obfuscation of Control-Flow of Sequential Computer Programs, Proceedings of ISC 2001 Information Security, 4th International Conference (LNCS 2200), Springer, Oct. 2001 , pp. 144-155.
S. Chow, P. Eisen, H. Johnson, P.C. van Oorschot. White-Box Cryptography and an AES Implementation Proceedings of SAC 2002 Conference on Selected Areas in Cryptography, Mar. 2002 (LNCS 2595), Springer, 2003.
S. Chow, P. Eisen, H. Johnson, P.C. van Oorschot, A White- Box DES Implementation for DRM Applications, Proceedings of DRM 2002 2nd ACM Workshop on Digital Rights Management. Nov. 18, 2002 (LNCS 2696). Springer, 2003.
G. Mullen and H. Stevens. Polynomial functions (mod m). Acta Mathematica Hungarica 44(3-4) , 1984. pp. 237-241.
T. Sander, C.F. Tschudin, Protecting Mobile Agents Against Malicious Hosts. pp. 44 60, Vigna, Mobile Agent Security (LNCS 1419), Springer. 1998.
Y. Zhou. A. Main. Y. Gu and H. Johnson, Information Hiding in Software with Mixed Boolean-Arithmetic Transforms, Information Security Applications, 8th International Workshop. WISA 2007. LNCS 4867.2008.
Ron Cytron, Jean Ferrante. Barry K Rosen, and Mark N. Wegman, Efficiently Computing Static Single Assignment Form and the Control Dependence Graph. ACM Transactions on Programming Languages and Systems 13(4), Oct. 1991. pp. 451-490.
T. Sander, C.F. Tschudin. Towards Mobile Cryptography, pp. 215-224, Proceedings of the 1998 IEEE Symposium on Security and Privacy.
G. H. Hardy and E. M. Wright, "An Introduction to the Theory of Numbers", Oxford Press.
A. Menexes. P. Oorschot. S. Vanstone, "Handbook of Applied cryptography" ,CRC Press. 1996.
Henry S. Warren. Jr., "Hacker's Delight", Addison-Wesley. Boston, 2002.
D. E. Knuth. The art of computer programming, vol. 2: seminumerical algorithms, 3rd edition, ISBN 0-201-89684-2, Addison-Wesley, Reading. Massachusetts, 1997.

(56) References Cited

OTHER PUBLICATIONS

International Search Report and Written Opinion cited in corresponding International Application No. PCT/CA2013/000305 dated Jul. 22, 2013.
Klimov, A. et al., "Cryptographic Applications of T-functions", Selected Areas in Cryptography, SAC 2003. Lecture Notes in Computer Science, Springer-Verlag, vol. 3006, pp. 248-261, 2004.
Extended European Search Report cited in corresponding European Application No. 13767519.5 dated Oct. 22, 2015.
Communication pursuant to Article 94(3) EPC issued in EP Patent Application No. 13767519.5, dated Nov. 13, 2017, 5 pages.

* cited by examiner

| opcode | | | L1 | L2 | L3 |
|---|---|---|---|---|---|
| operand 1 | | | | | |
| operand 2 | | | | | |
| operand 3 | | | | | |

FIGURE 2

| $k$ | opcode | 0 | 0 | 0 |
|---|---|---|---|---|
| register 1 | | | | |
| ⋮ | ⋮ | | | |
| register $k$ | | | | |

FIGURE 3

SECURING ACCESSIBLE SYSTEMS USING BASE FUNCTION ENCODING

The present application is the United States national stage of International Application No. PCT/CA2013/000305, filed Mar. 28, 2013, and which claims benefit of U.S. Provisional Application Nos. 61/617,991 filed Mar. 30, 2012 and 61/618,010 filed Mar. 30, 2012, the entire contents of which are incorporated herein by reference.

TECHNICAL FIELD

The present invention relates generally to electronic computing devices and computer systems, and more specifically, to securing software and firmware on devices and systems which are accessible to attack.

BACKGROUND

The use of computers, electronic computing devices and computer software in all of their various forms is recognized to be very common and is growing every day. As well, with the pervasiveness of powerful communication networks, the ease with which computer software programs and data files may be accessed, exchanged, copied and distributed is also growing daily. In order to take advantage of these computer and communication systems and the efficiencies that they offer, there is a need for a method of storing and exchanging computer software and data securely.

One method of maintaining confidentiality or privacy that has demonstrated widespread use and acceptance is encryption of data using secret cryptographic keys. Existing encryption systems are designed to protect their secret keys or other secret data against a "black box attack". This is a situation where an attacker has knowledge of the algorithm and may examine various inputs to and outputs from the algorithm, but has no visibility into the execution of the algorithm itself (such as an adaptive chosen input/output attack).

While cryptographic systems relying on the black box model are very common, it has been shown that this model does not reflect reality. Often, the attacker is in a position to observe at least some aspect of the execution of the algorithm, and has sufficient access to the targeted algorithm to mount a successful attack (i.e. side-channel attacks such as timing analysis, power analysis, cache attacks, fault injection, etc.) Such attacks are often referred to as "grey-box" attacks, the assumption being that the attacker is able to observe at least part of the system execution.

Recognizing this, an effort has been made to design encryption algorithms and data channels which are resistant to a more powerful attack model—the "white box attack". A white box attack is an attack on a software algorithm in which it is assumed that the attacker has full visibility into the execution of the algorithm. To date, such protection systems have met with reasonable success, but as such protection systems have become more and more sophisticated, so has the sophistication of the attacking techniques (such as encoding reduction attacks, statistical bucketing attacks and homomorphic mapping attacks). Thus, many existing white box protection systems are being shown to be ineffective against concerted attacks.

Obfuscation of software by means of simple encodings has been in use for some time. In order to be useful, applications of such encodings in software obfuscation must not increase the time and space consumption of the software unduly, so such encodings are typically relatively simple. Hence, while they can protect software in bulk, they do not provide a high degree of security. There are many communication boundaries in software which represent particular vulnerabilities: passage of data in unprotected form into or out of an obfuscated program, passage of data into or out of a cipher implementation in software or hardware, and the like. The strength of prior encoding strategies typically is sharply limited by the data sizes which they protect. For conventional encodings, such protected items are on the order of 32 bits, sometimes 64 bits, and sometimes smaller pieces of data such as characters or bytes. Given the limitations of encodings and the operand sizes, fairly swift brute-force cracking of such encodings cannot be prevented in general.

There is therefore a need for more effective secret-hiding and tamper-resistance techniques, providing protection of software code and data in general, as well as protection of secret cryptographic keys, biometric data, encrypted data and the like. It also is desirable to provide a much stronger form of protection for software boundaries than conventional simple encodings.

SUMMARY

Embodiments of the present invention aim generally at providing more effective secret-hiding and tamper-resistance techniques, providing protection of software code and data without fear that security will be breached.

The methods and systems disclosed herein are not limited to any particular underlying program. They may be applied to cryptographic systems, but equally, may be applied to non-cryptographic systems. As well, the software code that is being protected does not dictate what is done to protect it, so the protection techniques are not constrained by the underlying code. This may provide an advantage over other protection techniques which can leave or create patterns that are based on the underlying code. Such patterns may provide weaknesses that can be exploited by attackers.

Some embodiments disclosed herein provide "profound data dependence", which can make it difficult or impossible to unentangle or distinguish the protected code and the code which is providing protection. For example, AES algorithms typically execute the same way all the time, no matter what the input data is. This makes it straightforward for an attacker to know what he is looking for and where to find it. Most white box protection systems have a rigid equation structure which does not address this type of problem. That is, an attacker may know what types of operations or effects to look for, and where in code or execution to look to find those operations or effects. In contrast, embodiments disclosed herein may provide coding which is not rigid, such as where each iteration of a protection algorithm results in a different encoding. Thus, the system is extremely non-repeatable. Among other things, this may make embodiments disclosed herein more resistant to a "compare" type attack, in which an attacker changes 1 bit and observes how the targeted program changes. In some embodiments disclosed herein, if an attacker changes 1 bit, then the protected code will look completely different.

As a matter of overview, the embodiments of tools, families of tools, and techniques described herein may generally be grouped as follows:

1) Systems and techniques for blurring boundaries between modules of targeted code, and between the targeted code and the protection code. This may be accomplished, for example, by blending code together with surrounding code, and interleaving ciphers with other code, which is usually not done in other protective systems.
2) Systems and techniques for ensuring that a crack requires human intervention. Humans look for patterns that they have seen before. By introducing random functions according to embodiments disclosed herein, repetitive and/or common patterns can be removed so that automated attacks are largely ineffective.
3) Systems and techniques for protecting against "compare attacks". As noted above, a compare attack is an attack where two iterations of code execution are compared to see the difference, such as changing a single input bit to see how the operation and output change. Protection algorithms as disclosed herein may result in dramatically different functions with each iteration of the protected code, so a compare attack does not provide any useful information.

The obfuscation techniques described herein may be implemented wherever the overhead can be accommodated. White box protection systems typically have larger overheads than the techniques described herein, and are therefore at a disadvantage.

Some embodiments include systems and techniques for software protection that operate by applying bijective "base" functions to the targeted code. These base functions are pairs of mutually-inverse functions $f_K$, $f_K^{-1}$ which are used, for example, to encode an operation, and then un-encode the operation at a later point in a software application. The encoding obscures the original function and the data which it generates. There is no loss of information, as the unencoding operation accommodates for the encoding operation, "undoing" or "reversing" its effect later in the encoded application. Base function pairs may be chosen such that an attacker cannot easily find or determine the inverse function. That is, given a function $f_K$, the inverse $f_K^{-1}$ may not be found easily without the key K. The key K may be used at code generation time, but then discarded once the functions $f_K$, $f_K^{-1}$ have been generated and applied to the targeted code. These base function pairs are also lossless, i.e. mathematically invertible. The protected software application does not need to decode a function or process completely to use it elsewhere in the targeted code, as the encoding and unencoding changes are included within the encoded application. In some embodiments it may be preferred that the base functions are "deeply non-linear", thus making homomorphic attacks more difficult. In some embodiments, base function pairs may include permutation polynomial encodings. A permutation polynomial is a polynomial which is invertible (a polynomial bijection).

Some embodiments may generate or use base function pairs in such a manner that they generate "instance diversity" and "dynamic diversity". To achieve "instance diversity", each base function pair may create a secure "communication channel", such as between portions of a software application, between two software applications or platforms, or the like. Dynamic diversity may be created by linking operation of the software to the input data. Each time an encoding is performed, such as for communication between two encoded applications, instance and dynamic diversity may be generated between the two applications. The base functions may be highly "text dependent" so they offer good resistance to plaintext and perturbation attacks. If an attacker changes anything, even making a very small change such as the value of 1 bit, the change will result in a very large behavioural change. This feature is a significant contrast to conventional cipher code, which typically results in the same patterns and structure with each iteration of the code, regardless of the changes that an attacker makes. By making small changes and observing the impact, the attacker is able to gather information about the operation of cipher code, but he is not able to do the same with software encoded using systems and techniques disclosed herein. The diversity provided by embodiments disclosed herein also provides resistance to a "class crack". That is, it is not possible to provide an attack methodology which can systematically and automatically crack each embodiment of the invention in all cases. Note also, that conventional white box implementations and code optimizers will not provide sufficient diversity to gain any effective protection.

The diversity and non-invertibility of the inventive base functions increase the complexity of the attack problem immensely. In contrast to conventional software code or code protection systems, when attempting to defeat the systems and techniques disclosed herein, an attacker must first figure out what function, code portion, application, or the like he is attacking, then how to invert it, and then how to exploit it.

The diversity provided by embodiments disclosed herein may provide a variable, randomly-chosen structure to protected code. An engine which generates the base function pairs and encodings may rely on a random or pseudo-random key to choose the underlying function and/or the key. However, a key according to embodiments disclosed herein may not be as small as the keys of many conventional security systems (i.e. 64 or 128 bits); rather, it may be thousands or tens of thousands of bits. For example, a prototype was developed which uses 2,000 bits.

The base functions disclosed herein may include bijections used to encode, decode, or recode data. Such bijections may include the following characteristics:

1) Encoding wide data elements (typically four or more host computer words wide), unlike typical scalar encodings (see [5, 7] listed in the Appendix), but like block ciphers.

2) Encoding data only: unlike typical scalar encodings, but like ciphers, they are not required to protect computations other than those involved in their own recoding of data elements.

3) Concealing blocks or streams of data, and/or producing fixed-length hashes of blocks or streams of data for authentication purposes, similar to block ciphers, but unlike scalar encodings.

4) Employing forms of operations purposely chosen from the operation repertoire of the software in which they will reside and with which they will be interlocked; i.e., they are designed to resemble the code in the context of which they are embedded, unlike ciphers.

5) Unlike both ciphers and scalar encodings, employing massive multicoding. A scalar encoding generally employs one or at most a few mathematical constructions. A cipher typically employs a slightly larger number, but the number is still small. In some embodiments of the invention, a variety of encodings are applied to an entire function, creating an intricately interlaced structure resulting from the interaction of many forms of protection with one another.

6) Unlike both ciphers and scalar encodings providing massively diverse algorithmic architecture. Embodiments may have no fixed number of rounds, no fixed widths for operands of various substeps, no fixed interconnection of the various substeps, and no predetermined number of iterations of any kind.

7) Unlike both ciphers and scalar encodings, providing massive dynamic diversity by means of highly data-dependent algorithms: i.e., for any particular employment of a base function bijection, the path through its substeps, its iteration counts, and the like, depend intensely on the actual data input to be encoded, decoded, or recoded.

8) Unlike both ciphers and scalar encodings, providing massive interdependence with their embedding context; i.e., their behavior may depend strongly on the software in which they are embedded, and the software in which they are embedded can be made to depend strongly on them.

Some embodiments may use a large quantity of real entropy (i.e., a large truly random input). However, if an engine which generates the base function pairs is not itself exposed to attackers, it may be safe to employ significantly smaller keys which then generate much larger pseudo-random keys by means of a pseudo-random number generator, since in that case, the attacker must contend with both the real key entropy (that for the seed to the pseudo-random number generator) and the randomness inevitably resulting from the programming of the generator.

In some embodiments, biased permutations may also be used. If internal data is used to generate base function pairs or other encoding data/functions rather than random numbers, then the resulting encoding will contain bias. If code is introduced to create unbiased permutations that coding may be readily apparent, resulting in a weakness in the system. In contrast, embodiments disclosed herein may generate biased permutations, but then use various tools to make them less biased. This approach has been shown to be much less apparent than known techniques.

Some embodiments may include techniques for binding pipe-starts and pipe-ends, so that the targeted software code is tied to applications or platforms at both ends. This may be useful, for example, in a peer-to-peer data transfer environment or a digital rights management (DRM) environment. Systems and techniques disclosed herein also may be used to tie ciphers to other software applications or platforms, which is generally difficult to do using conventional techniques.

Some embodiments may use "function-indexed interleaving". This technique provides deep nonlinearity from linear components, and nonlinear equation solving. It can be used in many ways, such as boundary protection, dynamic constant generation (e.g. key-to-code), providing dynamic diversity (data-dependent functionality), self-combining ciphers, cipher mixing and combining ciphers and non-ciphers. For example, it may be used to mix black box ciphers with the other protection code disclosed herein, providing the long term security of a black box cipher, with the other benefits of white box security. As noted above, the encoding of the embodiments disclosed herein may be highly dependent on run-time data. With function index interleaving, two kinds of information are used: a key, K, which determines the base functions and structure, and R, which determines which obfuscations are to be applied to the "defining implementations". Typically the client does not see R. The key, K, may be augmented from the context, though in some examples described herein, only R is augmented in this way. Optionally, semi-consistent information or data from a user or his device (such as a smart phone, tablet computer, PDA, server or desktop computer system, or the like) such as an IP address, could be used to encode and decode as a runtime key.

Recursive function-indexed interleaving also may be used. Function-indexed interleaving typically interleaves arbitrary functions. If some of these functions are themselves functions obtained by function-indexed interleaving, then that is a recursive use of function-indexed interleaving.

Some embodiments may include random cross-linking, cross-trapping, dataflow duplication, random cross-connection, and random checks, combined with code-reordering, create omni-directional cross-dependencies and variable-dependent coding.

Some embodiments may use memory-shuffling with fractured transforms (dynamic data mangling) to hide dataflow may also be employed. In dynamic data mangling, an array A of memory cells may be used which can be viewed as having virtual indices $0, 1, 2, \ldots, M-1$ where M is the size of the array and the modulus of a permutation polynomial p on the finite ring Z/(M) (i.e., the integers modulo M), as in a C program array. However, for any given index i, there is no fixed position in the array to which it corresponds, since it is addressed as p(i), and p employs coefficients determined from the inputs to the program. The locations $A[p(0)]$, $A[p(1)]$, $\ldots$, $A[p(M-1)]$ may be considered "pseudo-registers" $R_1, \ldots, R_{M-1}$ extending those of the host machine. By moving data in and out of these registers, recoding the moved data at every move, and by re-using these "pseudo-registers" for many different values (e.g., by employing graph-coloring register allocation), the difficulty for an attacker to follow the data-flow of the program may be greatly increased.

Some embodiments may use "spread and blend" encoding. This is another way of describing the use of base functions plus code interleaving, which "smears out" the boundaries of the base functions to make them more difficult for an attacker to discern. General data blending may have portions of base functions that are mixed with other code, making it more difficult to identify and lift the code.

Some embodiments provide security lifecycle management. Black box security provides good long-term protection, but is not very useful in today's applications. Embodiments disclosed herein may refresh implementations faster than they can be cracked on unprotected devices. Different devices and applications have different needs. For example, a pay-per-view television broadcast such as a sporting event, may have very little value several days after the event, so it may only be necessary to provide sufficient security to protect the broadcast data for a day or so. Similarly, the market for computer games may tail off very quickly after several weeks, so it may be critical only to protect the game for the first few weeks or months. Embodiments disclosed herein may allow a user to apply the level of security that is required, trading off the security against performance. Literally, an adjustable "obfuscation dial" can be placed on the control console. Although the specific defined level of security achieved may be unknown, the intensity with which obfuscating methods are applied may be controlled. Generally, these settings may be adjusted when the application is created with its embedded base function, as part of a software development process. Security analysis may provide an estimate of how difficult the application will be to crack given a specific level of obfuscation. Based on the estimate, an engineering decision may be made of how to balance performance needs against the need for security, and "obfuscation dial" may be set accordingly. This kind of flexibility is not available with other protection systems. With AES, for example, a fixed key length and fixed code is used, which cannot be adjusted.

Some embodiments may provide a flexible security refresh rate, allowing for a trade-off of complexity for the "moving target" of refreshing code. In many cases, the need is to refresh fast enough to stay ahead of potential attackers.

Some embodiments may not have a primary aim of providing long-term data security in hacker-exposed environments. For that, the solution is not to expose the data to hackers, but only to expose means of access to the data by, e.g., providing a web presence for credential-protected (SecureID™, pass-phrases, etc.) clients which access the data via protected conversations which can expose, at most, a small portion of the data. In a hacker-exposed environment, it may be expected that a process of refreshing the exposed software in some fashion will be deployed. For example, in satellite TV conditional access systems, cryptographic keys embedded in the software in the set-top boxes (STBs) are refreshed on a regular basis, so that any compromise of the keys has value for only a limited period of time. Currently, such cryptographic keys may be protected over this limited exposure period by means of software obfuscation and/or white-box cryptography.

However, white-box cryptography has proven to be vulnerable to attacks which can be executed very swiftly by cryptographically-sophisticated attackers with expert knowledge of the analysis of executable programs, since the cryptographic algorithms employed are amongst the most thoroughly examined algorithms in existence, and the tools for analysing programs have become very sophisticated of late as well. Moreover, ciphers have peculiar computational properties in that they are often defined over arithmetic domains not normally used in computation: for example, AES is defined over a Galois field, RSA public-key cryptosystems are defined by modular arithmetic over extremely large moduli, 3DES over bit operations, table lookups, and bit-permutations extended with duplicated bits.

In fact, the sophisticated analysis of programs has created a method of attack which sometimes can bypass the need for cryptanalysis altogether: the code-lifting attack, whereby the attacker simply extracts the cryptographic algorithm and employs it with no further analysis (since it is, after all, an operational piece of software, however obfuscated it may be) to crack a software application's functionality.

Some embodiments may provide much stronger short-term resistance to attack. Such protection may be suitable for systems where the time over which resistance is needed is relatively short, because longer term security is addressed by means of refreshing the software which resides on the exposed platforms. This addresses a specific unfilled need which focusses at the point of tension created by highly sophisticated cryptanalytic tools and knowledge, extremely well studied ciphers, limited protections affordable via software obfuscation, highly sophisticated tools for the analysis of executable programs, and the limited exposure times for software in typical commercial content distribution environments. The goal is to prevent the kinds of attacks which experience with white-box cryptography has shown to be within the state of the art: swift cryptanalytic attacks and/or code-lifting attacks so swift that they have value even given the limited lifespans of validity between refreshes of the exposed programs (such as STB programs).

In many cases, it is only necessary to resist analysis for the duration of a refresh cycle, and to tie cipher-replacement so tightly to the application in which it resides that code-lifting attacks are also infeasible for the duration of a refresh cycle. The refresh cycle rate is determined by engineering and cost considerations: how much bandwidth can be allocated to refreshes, how smoothly we can integrate refreshes with ongoing service without loss of quality-of-service, and so on: these are all problems very well understood in the art of providing conditional access systems. These considerations indicate roughly how long our protections must stand up to analytic and lifting attacks.

Some embodiments may provide significantly larger encodings which can resist attacks for longer periods of time, by abandoning the notion of computing with encoded operands—as is done with the simpler encodings above—and replacing it with something more like a cipher. Ciphers themselves can be, and are, used for this purpose, but often they cannot easily be interlocked with ordinary software because (1) their algorithms are rigidly fixed by cipher standards, and (2) their computations are typically very different from ordinary software and therefore are neither readily concealed within it, nor readily interlocked with it. The base-functions described herein provide an alternative which permits concealment and interlocking: they make use of conventional operations, and their algorithms are enormously more flexible than is the case with ciphers. They can be combined with ciphers to combine a level of black-box security as strong as conventional cryptography with a level of white-box security significantly superior to both simple encodings as above and known white-box cryptography.

In some embodiments, a base function may be created by selecting a word size w and a vector length N, and generating an invertible state-vector function configured to operate on an N-vector of w-element words, which includes a combination of multiple invertible operations. The state-vector function may receive an input of at least 64 bits and provides an output of at least 64 bits. A first portion of steps in the state-vector function may perform linear or affine computations over $Z/(2^w)$. Portions of steps in the state-vector function may be indexed using first and second indexing techniques. At least one operation in an existing computer program may then be modified to execute the state-vector function instead of the selected operation. Each of the indexing techniques may control a different indexing operation, such as if-then-else constructs, switches, element-permutation selections, iteration counts, element rotation counts, function-indexed key indexes, or the like. Some of the steps in the state-vector function may be non-T-function operations. Generally, each step in the state-vector function may be invertible, such that the entire state-vector function is invertible by inverting each step. In some configurations the state-vector function may be keyed using, for example, a run-time key, a generation-time key, or a function-indexed key. The state-vector function may be implemented by various operation types, such as linear operations, matrix operations, random swaps, or the like. Various encoding schemes also may be applied to inputs and/or outputs of the state-vector function, and/or operations within the state-vector function. In some configurations, different encodings may be applied to as to produce fractures at various points associated with the state-vector function.

In some embodiments, base functions as disclosed herein may be executed by, for example, receiving an input having a word size w, applying an invertible state-vector function configured to operate on N-vectors of w-element words to the input, where the state-vector function includes multiple invertible operations, and a first portion of steps in the state-vector function perform linear or affine computations over $Z/(2^w)$. Additional operations may be applied to the output of the invertible state-vector function, where each is selected based upon a different indexing technique. Generally, the state-vector function may have any of the properties disclosed herein with respect to the state-vector function and base functions.

In some embodiments, a first operation may be executed by performing a second operation, for example, by receiving an input X encoded as A(X) with a first encoding A, performing a first plurality of computer-executable operations on the input using the value of $B^{-1}(X)$, where $B^{-1}$ is the inverse of a second encoding mechanism B, the second encoding B being different from the first encoding A, providing an output based upon $B^{-1}(X)$. Such operation may be considered a "fracture", and may allow for an operation to be performed without being accessible or visible to an external user, or to a potential attacker. In some configurations, the output of the first operation may not be provided external to executable code with which the first operation is integrated.

In some embodiments, for a matrix operation configured to receive an input and provide an output, prior to performing the operation, the input may be permuted according to a sorting-network topology. The matrix operation may be executed using the permuted input to generate the output, and the output permuted according to the sorting-network topology. The permuted output then may be provided as the output of the matrix operation.

In some embodiments, a first input may be received, and a function-indexed interleaved first function applied to the first input to generate a first output having a left portion and a right portion. A function-index interleaved second function may be applied to the first output to generate a second output, where the left portion of the first output is used as a right input to the second function, and the right portion of the first output is used as a left input to the second function. The second output may then be provided as an encoding of the first input.

In some embodiments, a key K may be generated, and a pair of base functions $f_x$, $f_K^{-1}$ generated based upon the key K and a randomization information R. The base function $f_K$ may be applied to a first end of a communication pipe, and the inverse $f_K^{-1}$ to a second end of the communication pipe, after which the key K may be discarded. The communication pipe may span applications on a single platform, or on separate platforms.

In some embodiments, one or more operations to be executed by a computer system during execution of a program may be duplicated to create a first copy of the operation or operations. The program may then be modified to execute the first operation copy instead of the first operation. Each operation and the corresponding copy may be encoded using a different encoding. Pairs of operations also may be used to create a check value, such as where the difference between execution of an operation result and execution of the copy is added to the result of the operation or the result of the operation copy. This may allow for detection of a modification made by an attacker during execution of the program.

In some embodiments, during execution of a program that includes multiple operations and a copy of each operation, upon reaching an execution point at which an operation of the plurality of operations should be performed, either a copy or the original operation may be selected randomly and executed by the program. The result of the randomly-selected operations may be equivalent to a result that would have been obtained had only a single copy of the operations been performed.

In some embodiments, an input may be received from an application. An array of size M may be defined with a number of M-register locations $c_1, \ldots, c_n$, with $n \leq M$. A permutation polynomial p, an input-based 1×n vector mapping matrix A yielding z from the input, and a series of constants $c_i = p(z+i)$ also may be defined. A series of operations may then be performed, with each operation providing an intermediate result that is stored in an M-register selected randomly from the M-registers. A final result may then be provided to the application based upon the series of intermediate results from a final M-register storing the final result. Each intermediate result stored in an M-register, may have a separate encoding applied to the intermediate result prior to storing the intermediate result in the corresponding M-register. The different encodings applied to intermediate results may be randomly chosen from among multiple different encodings. Similarly, different decodings, which may or may not correspond to the encodings used to store intermediate results in the M-registers, may be applied to intermediate results stored in M-registers. New M-registers may be allocated as needed, for example, only when required according to a graph-coloring allocation algorithm.

In some embodiments, a first operation g(y) that produces at least a first value a as an output may be executed, and a first variable x encoded as aX+b, using a and a second value b. A second operation f(aX+b) may be executed using aX+b as an input, and a decoding operation using a and b may be performed, after which a and b may be discarded. The value b also may be the output of a third operation h(z). Different encodings may be used for multiple input values encoded as aX+b, using different execution instances of g(y) and/or h(z). The values may be selected from any values stored in a computer-readable memory, based upon the expected time that the constant(s) are stored in the memory. Similarly, existing computer-readable program code containing instructions to execute an operation f(aX+b) and g(y), and g(y) produces at least a first value c when executed; may be modified to encode x as cX+d. The operation f(cX+d) may be executed for at least one x, and c and d subsequently discarded.

In some embodiments, at least one base function may be blended with executable program code for an existing application. For example, the base function may be blended with the executable program code by replacing at least one operation in the existing program code with the base function. The base function also may be blended with the existing application by applying one, some, or all of the techniques disclosed herein, including fractures, variable dependent coding, dynamic data mangling, and/or cross-linking. The base functions and/or any blending techniques used may include, or may exclusively include, operations which are similar or indistinguishable from the operations present in the portion of the existing application program code with which they are blended. Thus, it may be difficult or impossible for an attacker to distinguish the base function and/or the blending technique operations from those that would be present in the existing executable program code in the absence of the base function.

In some embodiments, a computer system and/or computer program product may be provided that includes a processor and/or a computer-readable storage medium storing instructions which cause the processor to perform one or more of the techniques disclosed herein.

Moreover, because the algorithms used with base functions disclosed herein may be relatively flexible and open-ended, they permit highly flexible schemes of software diversity, and the varied instances can differ more deeply than is possible with white-box cryptography. Thus, they are far less vulnerable to automated attacks. Whenever attacks can be forced to require human participation, it is highly advantageous, because we can new instances of protected code and data may be automatically generated at computer speeds, but they can only be compromised at human speeds.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

In the appended drawings:

FIG. 2 shows a Virtual Machine General Instruction Format, in accordance with the present invention;

FIG. 3 shows a Virtual Machine Enter/Exit Instruction Format, in accordance with the present invention;

Figure 26:
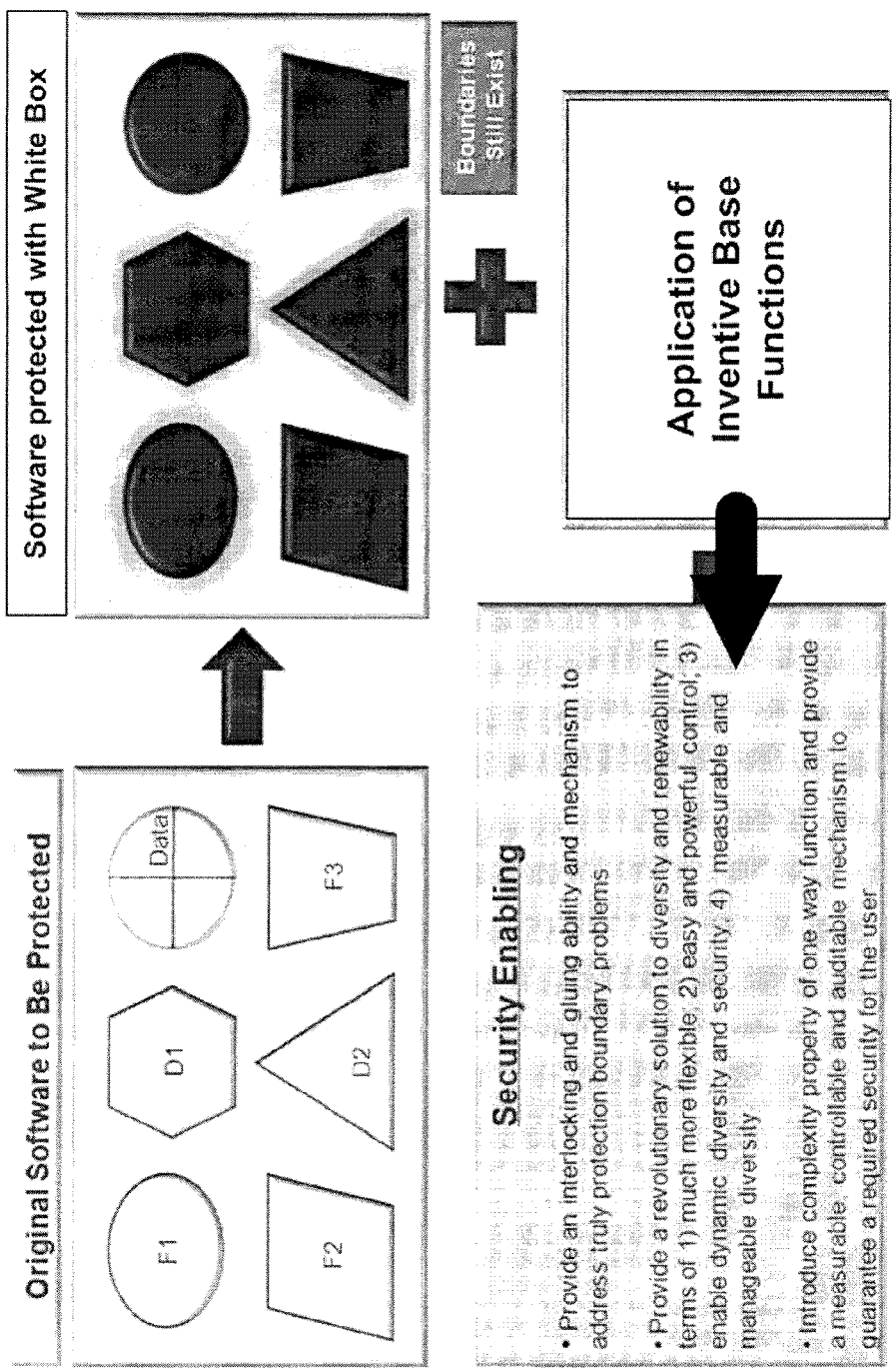
Figure 27:
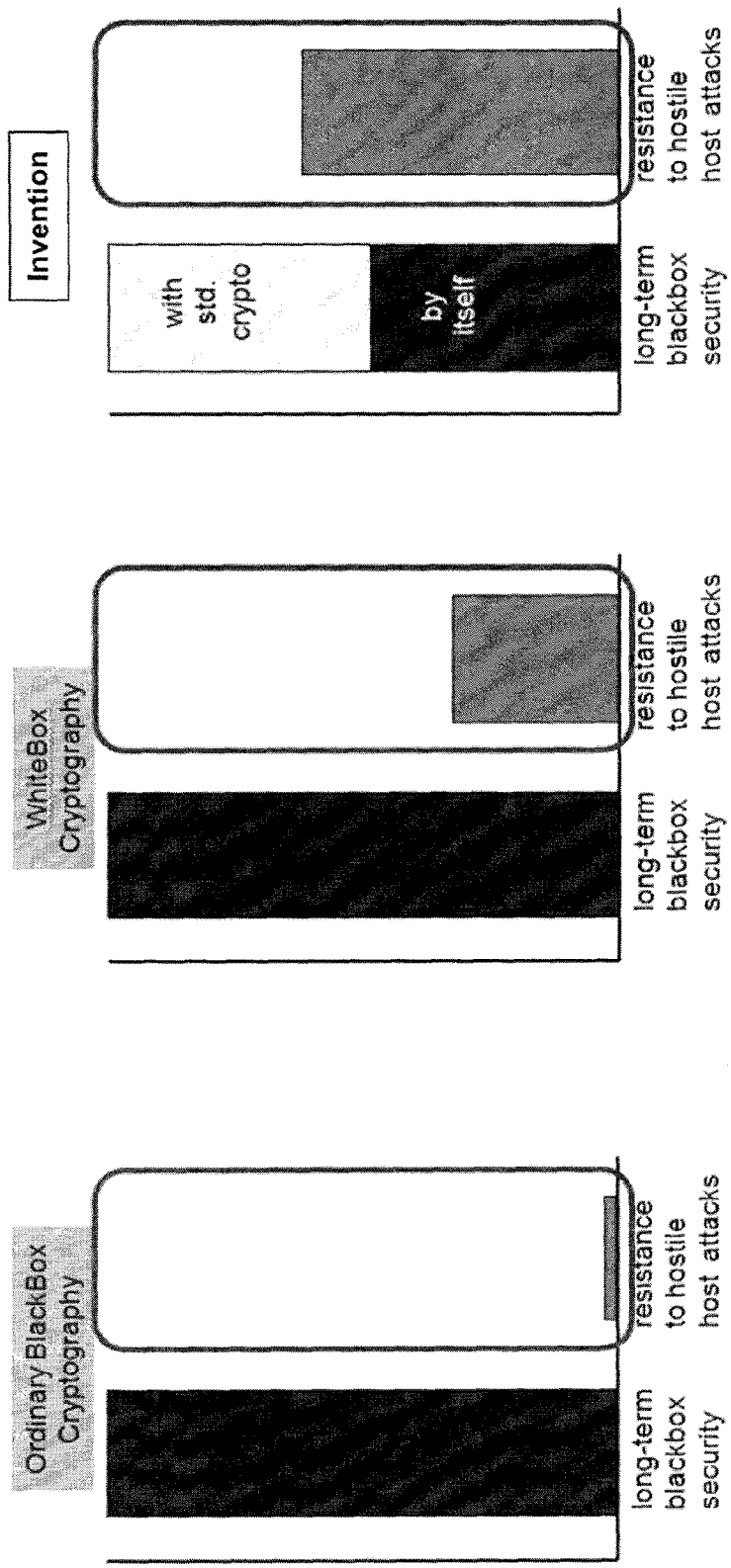
Figure 28:
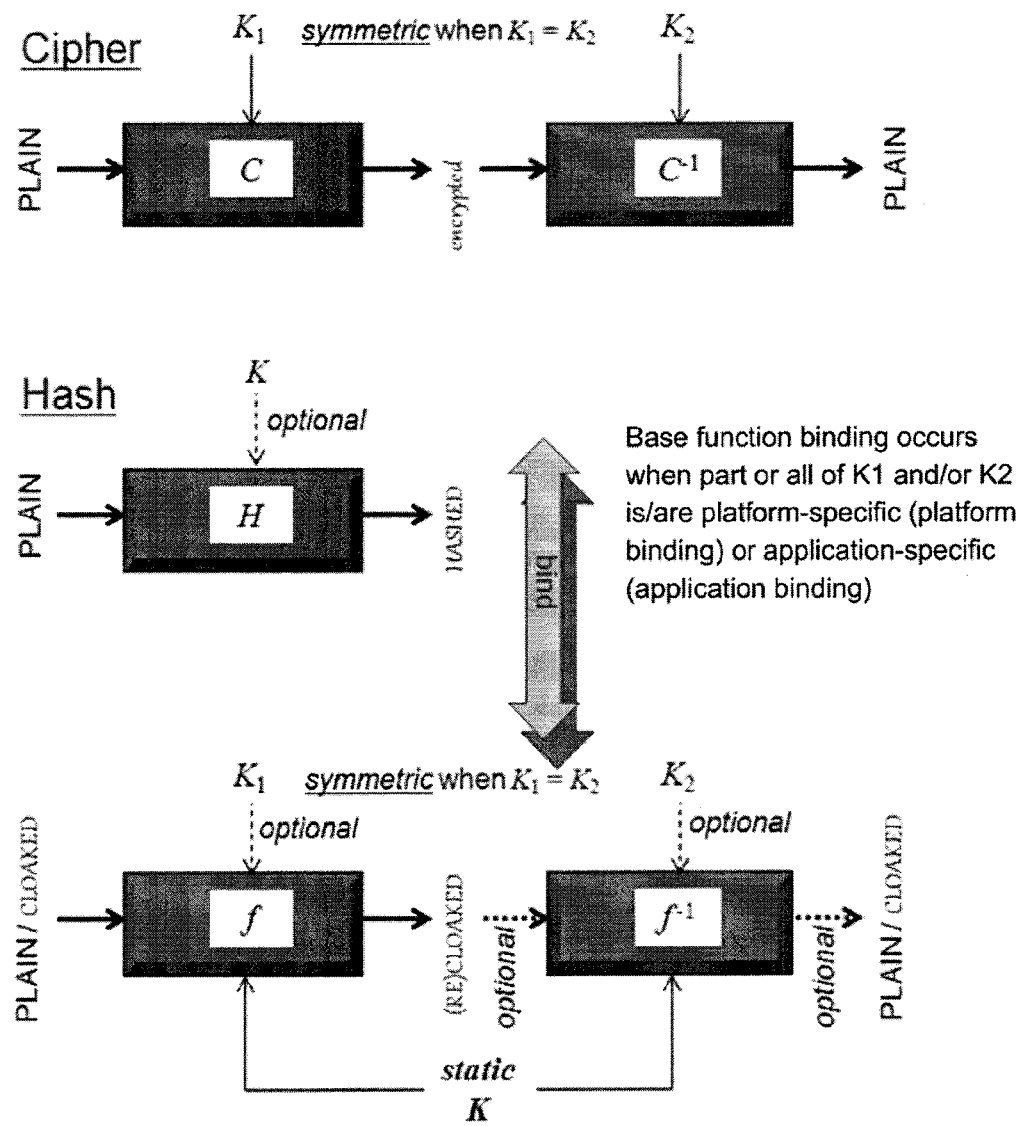
Figure 29:
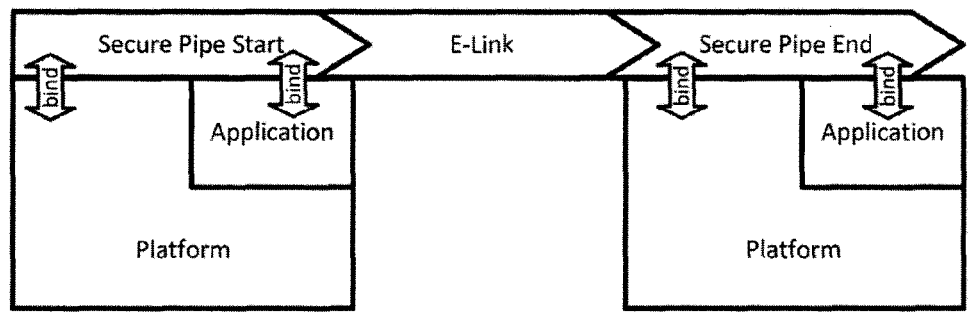
Figure 30:
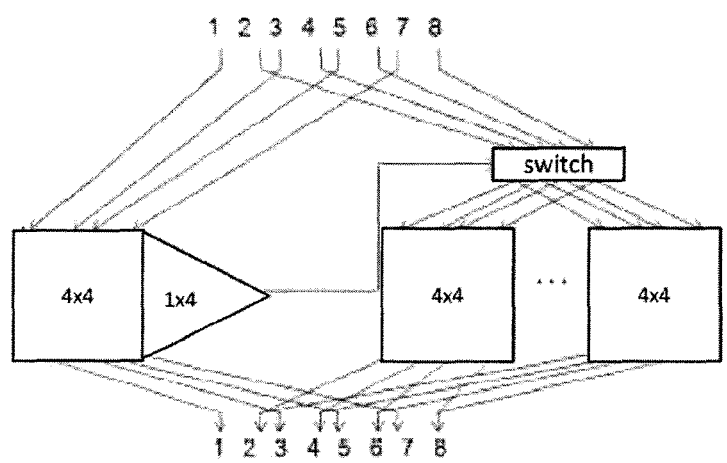
Figure 31:
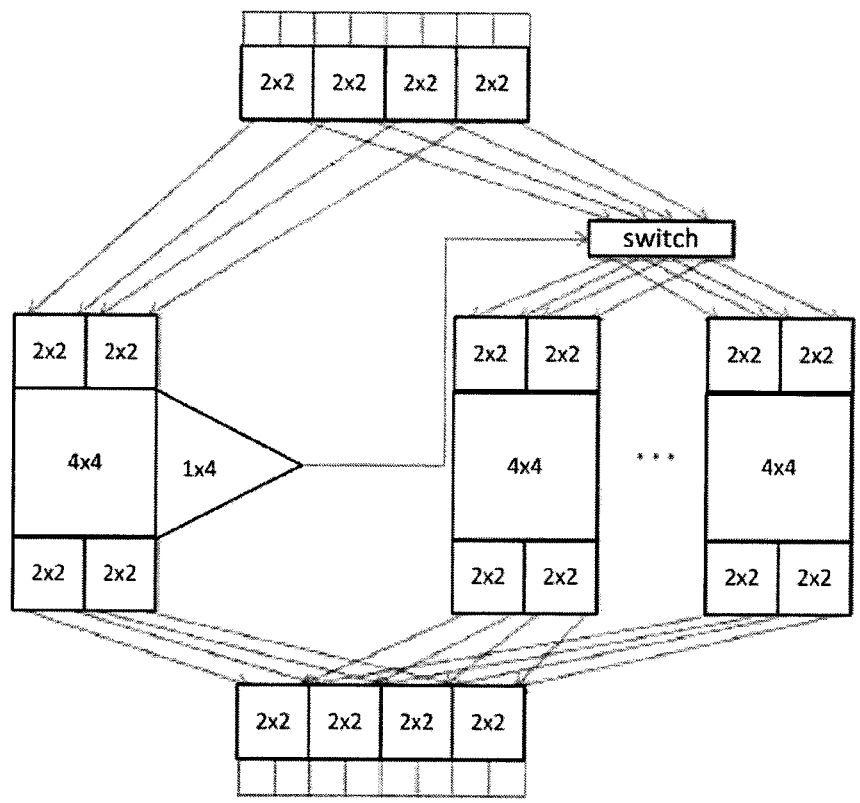
Figure 32:
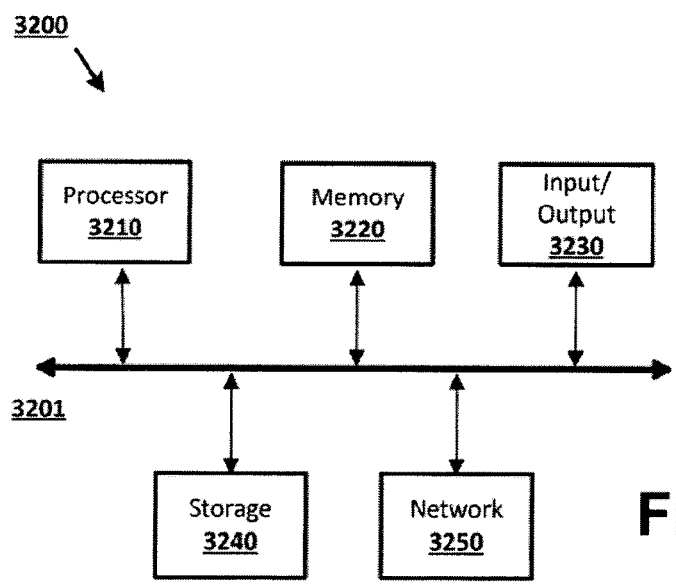

Table 25 presents a table which categorizes software boundary problems;

FIG. 26 shows a block diagram of an exemplary software system in unprotected form, under white box protection, and protected with the system of the invention;

FIG. 27 shows a bar diagram contrasting the levels of protection provided by black box, security, white box security and protection under an exemplary embodiment of the invention;

FIG. 28 shows a process flow diagram contrasting ciphers, hashes and exemplary base functions in accordance with the present invention;

FIG. 29 shows an exemplary block diagram of how base functions of the invention may be used to provide secure communication pipes;

FIG. 30 shows a process flow diagram for function-indexed interleaving in accordance with the present invention;

FIG. 31 presents a process flow diagram for implementation of the Mark I protection system of the invention;

FIG. 32 shows an example computer system suitable for implementing embodiments of the invention.

DETAILED DESCRIPTION

Embodiments disclosed herein describe systems, techniques, and computer program products that may allow for securing aspects of computer systems that may be exposed to attackers. For example, software applications that have been distributed on commodity hardware for operation by end users may come under attack from entities that have access to the code during execution.

Generally, embodiments disclosed herein provide techniques to create a set of base functions, and integrate those functions with existing program code in ways that make it difficult or impossible for a potential attacker to isolate, distinguish, or closely examine the base functions and/or the existing program code. For example, processes disclosed herein may receive existing program code, and combine base functions with the existing code. The base functions and existing code also may be combined using various techniques such as fractures, dynamic data mangling, cross-linking, and/or variable dependent coding as disclosed herein, to further blend the base functions and existing code. The base functions and other techniques may use operations that are computationally similar, identical, or indistinguishable from those used by the existing program code, which can increase the difficulty for a potential attacker to distinguish the protected code from the protection techniques applied. As will be described herein, this can provide a final software product that is much more resilient to a variety of attacks than is possible using conventional protection techniques.

Figure 25:
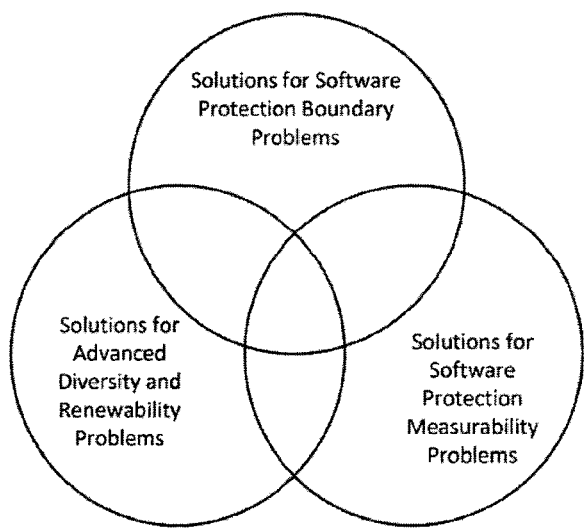
FIG. 25 shows an exemplary block diagram setting out the primary problems that the embodiments of the invention seek to address.

As shown in FIG. 25, embodiments disclosed herein may provide solutions for several fundamental problems that may arise when software is to be protected from attack, such as software boundary protection, advanced diversity and renewability problems and protection measurability problems.

Software boundary problems may be organized into five groups as shown in Table 1: skin problems, data boundaries, code boundaries, boundaries between protected data and protected code, and boundaries between protected software and secured hardware.

TABLE 1

| | Bounday Problem | Description |
|---|---|---|
| Skin Problem | Data flows from unprotected to protected domains<br>Data flows from protected to unprotected domains<br>Computation boundary between unprotected and protected domains | Attacks on unprotected data and computations can be starting points for compromising their data and computation counterparts in the protected domain. These problems typically are hard to solve without introducing a trusted enabling mechanism at the boundary. |
| Data Boundary | Data type boundary | Current data transformation techniques are limited to individual data types, not multiple data types or mass data. The boundaries among distinct protected data items stand out, permitting identification and partitioning. |
| | Data dependence boundary | Data diffusion via existing data flow protections is limited. Original data flow and computational logic is exposed. Most current whitebox cryptographic weaknesses are related to both data type and data dependency boundary problems. |
| | Data crossing functional boundaries | Data communications among functional components of an application system, whether running on the same or different devices, or as client and server, are made vulnerable because the communication boundaries are clearly evident. |
| Code Boundary | Functional boundaries among protected components | Boundaries among functional components are still visible after protecting those components. For example, whitebox cryptography components can be identified by their distinctive computations. In general, such protected computation segments can be easily partitioned, creating vulnerabilities to component-based attacks such as code lifting, code replacement, code cloning, replay, code sniffing, and code spoofing. |
| | Boundaries between injected code and the protected version of the original application code | Current individual protection techniques create secured code that is localized to particular computations. Code boundaries resulting from use of different protection techniques are not effectively glued and interlocked. |
| | Boundary between protected data and protected code | Protected data and protected code are not effectively locked together to prevent code or data lifting attacks. Current whitebox cryptographic implementations are vulnerable to such lifting attacks in the field. |
| | Boundary between protected software and secured hardware | We lack effective techniques to lock protected hardware and protected software to one another. The boundary between protected software and secure hardware is vulnerable, since data crossing the boundary is unprotected or weakly protected. |

There are three types of "skin problems" which may be addressed by embodiments disclosed herein: data flows from unprotected to protected domains, data flows from protected to unprotected domains, and computation boundaries between unprotected and protected domains. Ultimately, data and user interaction should be performed in an unencoded form, so that the user can understand the information. In each case, attacks on unprotected data and computations can be the starting point for compromising their data and computation counterparts in the protected domain. These problems conventionally are hard to solve without introducing a trusted enabling mechanism at the boundary. However, the diversity provided by embodiments disclosed herein, and encoding at the boundary itself, provides a degree of protection that is not provided by known systems.

Data Boundaries may be categorized as one of three types: data type boundaries, data dependency boundaries and data crossing functional component boundaries. With regard to data type boundaries, current data transformation techniques are limited to individual data types, not multiple data types or mass data. The boundaries among distinct protected data items stand out, permitting identification and partitioning. With regard to data dependency boundaries, data diffusion via existing data flow protections is limited: original data flow and computational logic is exposed. Most current white box cryptography weaknesses are related to both data type and data dependency boundary problems.

Finally, with regard to data crossing functional component boundaries, data communications among functional components of an application system, whether running on the same or different devices, or as client and server, are made vulnerable because the communication boundaries are clearly evident. The use of base function encodings and function-indexed interleaving by embodiments disclosed herein may address some or all of these data boundary issues because both the data and the boundaries themselves may be obscured.

Code Boundaries may be categorized into two types: functional boundaries among protected components, and boundaries between injected code and the protected version of the original application code. Functional boundaries among protected components are a weakness because boundaries among functional components are still visible after protecting those components. That is, with white box protection, the white box cryptographic components can generally be identified by their distinctive computations. In general, such protected computation segments can be easily partitioned, creating vulnerabilities to component-based attacks such as code lifting, code replacement, code cloning, replay, code sniffing, and code spoofing. Similarly, boundaries between injected protection code and the protected version of the original application code are also generally visible. Current individual protection techniques create secured code that is localized to particular computations.

Code boundaries resulting from use of different protection techniques are not effectively glued and interlocked. In contrast, the use of base function encodings and function-indexed interleaving by embodiments disclosed herein may address all of these code boundary issues, because code may be obscured and interleaved with the protection code itself. Because basic computer processing and arithmetic functions are used for the protection code, there is no distinctive code which the attacker will quickly identify.

The boundary between protected data and protected code presents another weakness which can be exploited by an attacker as current white box techniques do not secure the boundary between protected data and protected code. In contrast, embodiments disclosed herein may lock together the protected data and protected code, to prevent code or data lifting attacks. Current white box cryptography implementations are vulnerable to such lifting attacks in the field.

Similarly, the boundary between protected software and secured hardware presents a vulnerability as existing white box techniques do not protect the boundary between protected software and secure hardware—data crossing such a boundary is unprotected or weakly protected. In contrast, embodiments disclosed herein may lock protected hardware and protected software to one another.

There are also logistical issues associated with security, in particular, diversity and renewability problems. Current program diversity is limited by program constructs and structures, and by limitations of the individual protection techniques applied. As a result, diversified instances do not vary deeply (e.g., program structure variation is extremely limited), and instances may be sufficiently similar to permit attacks based on comparing diversified instances. Current protection techniques are limited to static diversity and fixed security. In contrast, embodiments as disclosed herein may provide dynamic diversity which may allow for intelligent control and management of the level of security provided by diversity and renewability. As disclosed in further detail herein, resolving advanced diversity and renewability problems may be fundamental to security lifecycle management.

FIG. 26 shows a block diagram of an example software system protected under a known white box model, and under an example embodiment as disclosed herein. The original code and data functions, modules and storage blocks to be protected are represented by the geometric shapes labeled F1, F2, F3, D1 and D2. Existing white box and similar protection techniques may be used to protect the various code and data functions, modules and storage blocks, but even in a protected form they will (at the very least) disclose unprotected data and other information at their boundaries. In contrast, embodiments of the present invention may resolve these boundary problems. In some cases, once an instance of an embodiment as disclosed herein has been executed, an observer cannot tell which parts are F1, F2, F3, D1, D2 and data from the original program, even though the observer has access to the program and can observe and alter its operation.

This may be accomplished, for example, by interleaving the code together between different code and data functions, modules and storage blocks, thus "gluing" these components together. With the code closely tied in this way, true boundary protection can be provided. As described above, diversity and renewability are provided in terms of 1) much greater flexibility being provided than past systems; 2) easy and powerful control; 3) enable dynamic diversity and security; and 4) measurable and manageable diversity. Embodiments disclosed herein also may provide a "complexity property" of one-way bijection functions, as well as a measurable, controllable and auditable mechanism to guarantee required security for the user. Bijections are described in greater detail hereinafter, but in short, they are lossless pairs of functions, $f_K$, $f_K^{-1}$, which perform a transposition of a function, which is undone later in the protected code. The transposition may be done in thousands or millions of different ways, each transposition generally being done in a completely different and non-repeatable manner Various techniques may be used to conceal existing programs, achieving massive multicoding of bijective functions, which are not humanly programmed, but are generated by random computational processes. This includes bijective functions which can be used in cipher- and hash-like ways to solve boundary problems.

Embodiments disclosed herein may provide improved security and security guarantees (i.e. validated security and validated security metrics) relative to conventional techniques. Greater diversity in time and space than is provided by white box cryptography also may be achieved. The security metrics are based on computational complexity of known attacks, the basic primitive being the generation of mutually inverse function pairs. Other primitives can be constructed as described herein, with or without symmetric or asymmetric auxiliary keys.

FIG. 27 contrasts conventional black box and white box models with properties of the embodiments disclosed herein, in terms of the long-term security and resistance to hostile attacks. Cryptography is largely reliant on Ciphers and Hashes; Ciphers enable transfer of secrets over unsecured or public channels, while Hashes validate provenance. These capabilities have enormous numbers of uses. In a black-box environment, such cryptographic techniques may have very good long term security. However, in terms of resistance to attacks, such systems have a very short life. As explained above, Ciphers and Hashes have a rigid structure and very standardized equations which are straightforward to attack. White box protection may be used to improve the level of resistance to attacks, but even in such an environment the protected code will still reveal patterns and equations from the original Cipher-code and Hash-code, and boundaries will not be protected. As well, white box protection will not provide diversity which protects code against perturbation attacks.

In contrast, embodiments disclosed herein may incorporate Cipher-like and Hash-like encodings, which gives the protective encodings the security and strength of Ciphers and Hashes. In other words, the process of applying white box encodings to Ciphers and Hashes typically uses simple encodings in an attempt to protect and obscure very distinctive code. The techniques disclosed herein, however, may use strong, diverse encodings to protect any code. With the diverse encodings and interleaving as disclosed, distinctiveness in the targeted code will be removed. Thus, as shown, the disclosed techniques may provide a much stronger security profile than conventional black box and white box protection.

Figure 1:
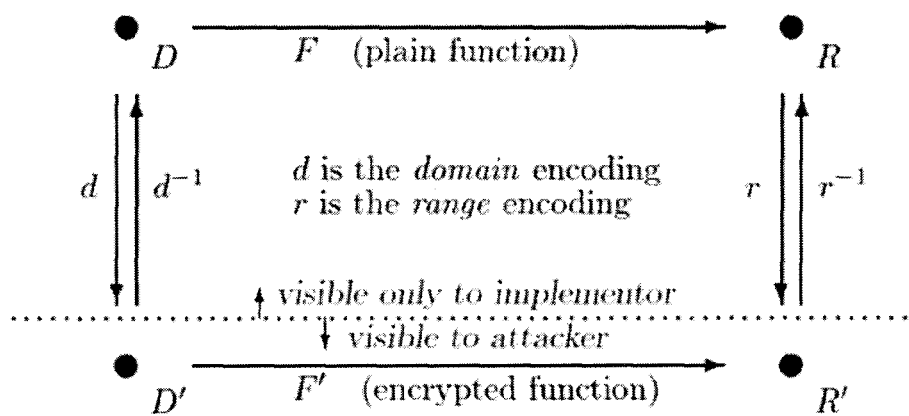
FIG. 1 shows a commutative diagram for an encrypted function, in accordance with the present invention.

FIG. 1 shows a commutative diagram for an encrypted function using encodings, in accordance with embodiments of the present invention. For a F where F: D→R is total, a bijection d: D→D' and a bijection r: R→R' may be selected. F'=r∘F∘d$^{-1}$ is an encoded version of F; d is an input encoding or a domain, encoding and r is an output encoding or a range encoding. A bijection such as d or r is simply called an encoding. In the particular case where F is a function, the diagram shown in FIG. 1 then commutes, and computation with F' is computation with an encrypted function. Additional details regarding the use of such encodings generally are provided in Section 2.3 of the Appendix.

FIG. 28 contrasts the properties of conventional Ciphers and Hashes with those of the bijective base functions disclosed herein. Ciphers are non-lossy functions; they preserve all of the information that they encode, so the information can be unencoded and used in the same manner as the original. Ciphers are invertible provided that one is given the key(s), but it is hard to determine the key or keys K1, K2 from instances of plain and encrypted information ("PLAIN" and "ENCRYPTED" in FIG. 28). Hashes are lossy above a certain length, but this typically is not a problem because hashes are generally used just for validation. With a hash it is hard to determine the optional key, K, from instances of the original data and the hash ("PLAIN" and "HASHED" in FIG. 28).

The base functions disclosed herein may serve in place of either ciphers or hashes, as it is hard to determine the key or keys from consideration of the encoding and unencoding functions $f_K$, $f_K^{-1}$. The advantage that the base functions provide over the use of Ciphers or Hashes, is that the computations used by the base functions are more similar to ordinary code, which makes it easier to blend the code of the base functions with the targeted code. As noted above, Ciphers and Hashes use very distinctive code and structure which is difficult to obscure or hide, resulting in vulnerability.

Mutually-inverse base function pairs as disclosed herein may employ random secret information (entropy) in two ways: as key information K which is used to determine the mutually inverse functions $f_K$, $f_K^{-1}$, and as randomization information R which determines how the $f_K$, $f_K^{-1}$, implementations are obscured.

For example, two mutually inverse base functions may be represented by subroutines G and H, written in C. The base functions may be constructed by an automated base function generator program or system, with G being an obfuscated implementation of the mathematical function $f_K$ and H being an obfuscated implementation of the mathematical function $f_K^{-1}$. Thus, G can be used to 'encrypt' data or code, which can then be 'decrypted' with H (or vice versa).

Optionally, run-time keys can be provided in additional to the build-time key K. For example, if the input of a given base function is wider than the output, the extra input vector elements can be used as a run-time key. This is much like the situation with a cipher such as AES-128. A typical run of AES-128 has two inputs: one is a 128-bit key, and one is a 128-bit text. The implementation performs encipherment or decipherment of the text under control of the key. Similarly, a base-function can be constructed to encrypt differently depending on the content of its extra inputs, so that the extra inputs in effect become a runtime key (as opposed to the software generation time key K controlling the static aspects of the base function). The building blocks of base functions disclosed herein make it relatively easy to dictate whether the runtime key is the same for the implementations of both $f_K$, $f_K^{-1}$ or is different for $f_K$ than for $f_K^{-1}$: if the runtime key is added to the selector vector, it is the same for $f_K$ and $f_K^{-1}$, and if it is added elsewhere, it differs between $f_K$ and $f_K^{-1}$.

Key information K can be used to select far more varied encoding functions than in known white box systems, permitting much stronger spatial and temporal diversity. Diversity is also provided with other techniques used in embodiments of the invention such as Function-Indexed Interleaving which provides dynamic diversity via text-dependence. Further diversity may also be provided by variants of Control-Flow Encoding and Mass-Data Encoding described hereinafter.

Base functions as disclosed herein may incorporate or make use of state vector functions. In general, as used herein a state-vector function is organized around a vector of N elements, each element of which is a w-bit quantity. The state vector function may be executed using a series of steps, in each of which a number between zero and N of the elements of the vector are modified. In a step in which zero elements are modified, the step essentially applies the identity function on the state-vector.

In some embodiments, one or more of the state-vector functions used in constructing a base function may be invertible. A state-vector function is invertible if, for each and every step in the state-vector function, a step-inverse exists such that that applying the step-algorithm and then applying the step-inverse algorithm has no net effect. Any finite sequence of invertible steps is invertible by performing the inverse-step algorithms in the reverse order of their originals.

Illustrative examples of invertible steps on a vector of w-bit elements include adding two elements, such as adding i to j to obtain i+j, multiplying an element by an odd constant over $Z/(2^w)$, mapping a contiguous or non-contiguous sub-vector of the elements to new values by taking the product with an invertible matrix over $Z/(2^w)$. The associated inverse steps for these examples are subtracting element i from element j, multiplying the element by the multiplicative inverse of the original constant multiplier over $Z/(2^w)$, and mapping the sub-vector back to its original values by multiplying by the inverse of that matrix, respectively.

Some embodiments may use one or more state-vector functions that have one or more indexed steps. A step is indexed if, in addition to its normal inputs, it takes an additional index input such that changing the index changes the computed function. For example, the step of adding a constant vector could be indexed by the constant vector, or the step of permuting a sub-vector could be indexed by the permutation applied. In each case, the specific function executed is determined at least in part by the index provided to the function.

Indexed steps also may be invertible. Generally, an indexed step is invertible if it computes an invertible step for each index, and the index used to compute the step, or information from which that index can be derived, is available when inverting the step. For example, $S_{17}$ is invertible if $S_{17}^{-1}$ is defined, and the index (17) is available at the appropriate time to ensure that it $S_{17}^{-1}$ is computed when inverting the state-vector function. As an example, a step may operate on some elements of the state. To index this step, other elements of the state may be used to compute the index. If invertible steps are then performed on the other elements, the index by may be retrieved by inverting those steps, as long as the two sets of elements do not overlap.

Function-Indexed Interleaving as disclosed herein is a specific example of the principle of the use of indexed steps within a base function. Other uses of indexed steps as disclosed herein may include: allowing the creation of keyed state-vector functions: the set of indexes used in some of the indexed steps can be used as a key. In that case, the index is not obtained from within the computation, but is provided by an additional input; i.e., the function takes the state-vector plus the key as an input. If the indexed steps are invertible, and the ordinary, non-indexed steps are invertible, then the whole state-vector function is invertible, rather like a keyed cipher.

In some embodiments, the index information may provide or may serve as a key for the generated base functions. If the state-vector function is partially evaluated with respect to the index information when the state-vector function is generated, so that the index does not appear in the execution of the generated function explicitly, it is a generation-time key. If code to handle the index information is generated during execution of the state-vector function, so that the index does appear in the execution of the generated function explicitly, it is a run-time key. If the code internally generates the index within the state-vector function, it is a function-indexed key.

In an embodiment, a base function may be constructed based upon an initial selected or identified word-size w. In some configurations, the default integer size of the host platform may be used as the word size w. For example, on modern personal computers the default integer size typically is 32 bits. As another example, the short integer length as used, for example, in C may be used, such as 16 bits. In other configurations, a 64-bit word size may be used. A vector length N is also selected for the base function, which represents the length of inputs and outputs in the w-sized words, typically encompassing four or more words internally. In some embodiments, such as where interleaving techniques as disclosed herein are used, it may be preferred for the word size w to be twice the internal word size of the N-vector. The state-vector function then may be created by concatenating a series of steps or combinations of steps, each of which performs invertible steps on N-vectors of w-element word. The inverse of the state-vector function may be generated by concatenating the inverses of the steps in the reverse order.

In some embodiments, one or more keys also may be incorporated into the state-vector function. Various types of keying may be applied to, or integrated with, the state-vector function, including run-time keying, generation-time keying, and function-indexed keying as previously described. To generate a run-time keyed state-vector function, the function may be modified to receive the key explicitly as an additional input to the function. To generate a generation-time keyed state-vector function, code in the state-vector function may be partially evaluated with respect to a provided key. For many types of operations, this alone or in conjunction with typical compiler optimizations may be sufficient to make the key unrecoverable or unapparent within the generated code. To generate a function-indexed keyed state-vector function, the state-vector function may be constructed such that appropriate keys for inverse operations are provided as needed within the state-vector function.

In some embodiments, it may be preferred to select an implementation for the state-vector function that accepts a relatively wide input and provides a relatively wide output, and which includes a complex set of invertible steps. Specifically, it may be preferred to construct an implementation that accepts at least a 64-bit wide input and output. It also may be preferred for a significant number of steps in the state-vector function, such as at least 50% or more, to be linear or affine operations over $Z/(2^w)$. It also may be preferred to select steps for the state-vector function which have wide variety In some embodiments, it may be preferred to index a significant portion of the steps, such as at least 50% or more, using multiple forms of indexing. Suitable forms of indexing include if-then-else or switch constructs, element-permutation selection, iteration counts, element rotation counts, and the like. It also may be preferred for some or all of the indexes to be function-indexed keys as disclosed herein.

In some embodiments, it may be preferred for the initial and/or final steps of the state-vector function to be steps which mix input entropy across the entire state-vector, typically other than any separate key-input.

In some embodiments, it may be preferred to construct the state-vector function such that at least every few steps, a non-T-function step is performed. Referring to programming operations, examples of T-function steps include addition, subtraction, multiplication, bitwise AND, bitwise XOR, bitwise NOT, and the like; examples of non-T-function steps include division, modulo assignment, bitwise right shift assignment, and the like. Other examples of non-T-function steps include function-indexed keyed element-wise rotations, sub-vector permutations, and the like. As previously disclosed, the inclusion of non-T-function steps can prevent or reduce the efficacy of certain types of attacks, such as bit-slice attacks.

As previously described, a state-vector function pair includes the state-vector function as described herein and the complete inverse of the state-vector function. In operation, construction of the state-vector function pair may, but need not be performed by, for example, combining a series of parameterized algorithms and/or inverse algorithms in the form of language source such as C++ code or the like. Similarly, substitution of generation-time keys may, but need not be performed by a combination of macro substitution in the macro preprocessor, function in-lining, and use of parameterized templates. Such combinations, substitutions, and other operations may be automated within a state-vector generating system as disclosed herein. Once the state-vector function pair has been generated, one or both may be protected using binary- and/or compiler-level tools to further modify the generated code. In some embodiments, the specific modifications made to one or both functions in the state-vector function pair may be selected based upon whether or not each member is expected to execute in an environment likely to be subject to attack.

For example, in some embodiments, the function or a part of the function that is expected to be in an exposed environment may be bound near a point at which an input vector is provided to the state-vector function, and/or near the point where an output vector is consumed by its invoking code. The code may be bound by, for example, the use of dynamic data mangling and/or fractures as disclosed herein. For example, the inputs provided may be from a mangled store, and outputs may be fetched by an invoker from the mangled store. Other techniques may be used to bind code at these points, such as data-flow duplication with cross-linking and cross-trapping as disclosed herein. Different combinations may be used, such as where dynamic data mangling, fractures, and data-flow duplication are all applied at the same point to bind the code at that point. The protections applied to code expected to be in an exposed environment may be applied within one or both of the state-vector function, with the portion of the code affected determined by the needed level of security. For example, applying multiple additional protection types at each possible point or almost each possible point may provide maximal security; applying a single protection at multiple points, or multiple protection types at only a single code point, may provide a lower level of security but improved performance during code generation and/or execution. In some embodiments, fractures may be applied at multiple points throughout the generation and binding process, because many opportunities for fracture creation may exist due to generation of many linear and affine operations among the steps of the state-vector function during its construction.

In some embodiments, it may be useful to make one member of a state-vector function pair more compact than the other. This may be done, for example, by making the other member of the pair more expensive to compute. As a specific example, when one member of a state-vector function pair is to be used on exposed and/or limited-power hardware such as a smart card or the like, it may be preferred for a hardware-resident member of the state-vector function pair to be significantly more compact than in other embodiments disclosed herein. To do so, a corresponding server-resident or other non-exposed member of the state-vector function pair may be made significantly more costly to compute. As a specific example, rather than using a relatively high number of coefficients as disclosed and as would be expected for a state-vector function generation technique as disclosed previously, a repetitious algorithm may be used. The repetitious algorithm may use coefficients supplied by a predictable stream generation process or similar source, such as a pseudo-random number generator that uses a seed which completely determines the generated sequence. A suitable example of such a generator is the a pseudo-random generator based on ARC4. In some embodiments, such as where the available RAM or similar memory is relatively limited, a variant that uses a smaller element size may be preferred. The pseudo-random number generator may be used to generate all matrix elements and displacement-vector elements. Appropriate constraints may be applied to ensure invertibility of the resulting function. To invert, the generated matrices can be reproduced by knowledge of the seed, at the cost of creating the complete stream used in the exposed pair member, reading it in reverse, multiplicatively inverting each matrix, and additively inverting each vector element in a displacement, over $Z/(2^w)$. Thus, a limited-resource device such as a smart card may be adapted to execute one of a state-vector function pair, while the system as a whole still receives at least some of the benefits of a complete state-vector function system as disclosed herein.

Securing Communication Pipes

As shown in the block diagram of FIG. 29, base functions as disclosed herein may be used to provide a secure communication pipe from one or more applications on one or more platforms, to one or more applications on one or more other platforms (i.e. an e-link). The same process may be used to protect communication from one sub-application to another sub-application on a single platform. In short, a base function pair $f_K$, $f_{K^{-1}}$ may be used to protect a pipe by performing a cipher-like encrypt and decrypt at respective ends of the pipe. In an embodiment, the base function pair $f_K$, $f_{K^{-1}}$ may be applied to the pipe start and pipe end, and also applied to the application and its platform, thus binding them together and binding them to the pipe. This secures (1) the application to the pipe-start, (2) the pipe-start to the pipe-end, and (3) the pipe-end to the application information flow.

An illustrative way of effecting such a process is as follows. Firstly, a key K is generated using a random or pseudo-random process. The base-functions $f_K$, $f_K^{-1}$ are then generated using the key K and randomization information R. The base functions are then applied to pipe-start and pipe-end so that at run time, the pipe-start computes $f_K$, and the pipe-end computes $f_K^{-1}$. The key K can then be discarded as it is not required to execute the protected code. In an application such as this, the base-function specifications will be cipher-based specifications for $f_K$, $f_K^{-1}$ (similar to FIPS-197 for AES encrypt and decrypt). Cloaked base-functions are specific implementations (pipe-start and pipe-end above) of the smooth base-functions designed to foil attempts by attackers to find K, invert a base-function (i.e., break encryption), or break any of the bindings shown above. That is, a smooth base function is one which implements $f_K$ or $f_K^{-1}$ straightforwardly, with no added obfuscation. A cloaked base function still computes $f_K$ or $f_K^{-1}$, but it does so in a far less straightforward manner. Its implementation makes use of the obfuscation entropy R to find randomly chosen, hard to follow techniques for implementing $f_K$ or $f_K^{-1}$. Further examples of techniques for creating and using cloaked base functions are provided in further detail herein.

Function-Indexed Interleaving

To guard against homomorphic mapping attacks, embodiments disclosed herein may use replace matrix functions with functions which are (1) wide-input; that is, the number of bits comprising a single input is large, so that the set of possible input values is extremely large, and (2) deeply nonlinear; that is, functions which cannot possibly be converted into linear functions by i/o encoding (i.e., by individually recoding individual inputs and individual outputs). Making the inputs wide makes brute force inversion by tabulating the function over all inputs consume infeasibly vast amounts of memory, and deep nonlinearity prevents homomorphic mapping attacks.

Some embodiments may use "Function-Indexed Interleaving", which may provide diffusion and/or confusion components which are deeply nonlinear. A function from vectors to vectors is deeply nonlinear if and only if it cannot be implemented by a matrix together with arbitrary individual input- and output-encodings. If it is not deeply nonlinear, then it is "linear up to I/O encoding" ("linearity up to I/O encoding" is a weakness exploited in the BGE attack on WhiteBox AES.)

Function-Indexed Interleaving allows conformant deeply nonlinear systems of equations to be solved by linear-like means. It can be used to foster data-dependent processing, a form of dynamic diversity, in which not only the result of a computation, but the nature of the computation itself, is dependent on the data. FIG. 30 shows a process flow diagram of an example Function-Indexed Interleaving process, which interleaves a single 4×4 function with a family of 4×4 functions. The 1×1 function with 1×1 function-family case permits combining of arbitrary kinds of functions, such as combining a cipher with itself (in the spirit of 3DES) to increase key-space; combining different ciphers with one another; combining standard ciphers with other functions; and combining hardware and software functions into a single function.

In the example implementation shown in FIG. 30, the square boxes represent bijective functions, typically but not necessarily implemented by matrices. The triangle has the same inputs as the square box it touches and is used to control a switch which selects among multiple right-side functions, with inputs and outputs interleaving left-side and right-side inputs and outputs as shown:
- if the left-side box and right-side boxes are 1-to-1, so is the whole function;
- if the left-side box and right-side boxes are bijective, so is the whole function;
- if the left-side box and right-side boxes are MDS (maximum distance separable), so is the whole function, whether bijective or not.

If the triangle and all boxes are linear and chosen at random, then (by observation) over 80% of the constructions are deeply nonlinear.

In an example embodiment disclosed herein, function-indexed interleaving appears four times in an $f_K$, $f_K^{-1}$ specification. Each time it includes three 4×4 linear mappings for some 4×4 matrix M. Each instance of function-indexed interleaving has a single left-side function and $2^4=16$ right-side functions.

Notably, function-indexed interleaving also may be nested, such that the left-function or right-function-family may themselves be instances of function-indexed interleaving. In such a configuration, the result is a recursive instance of function-indexed interleaving. In general, such instances typically are more difficult for an attacker to understand than non-recursive instances; that is, increasing the level of recursion in function-indexed interleaving should increase the level of obscurity.

Figure 8:
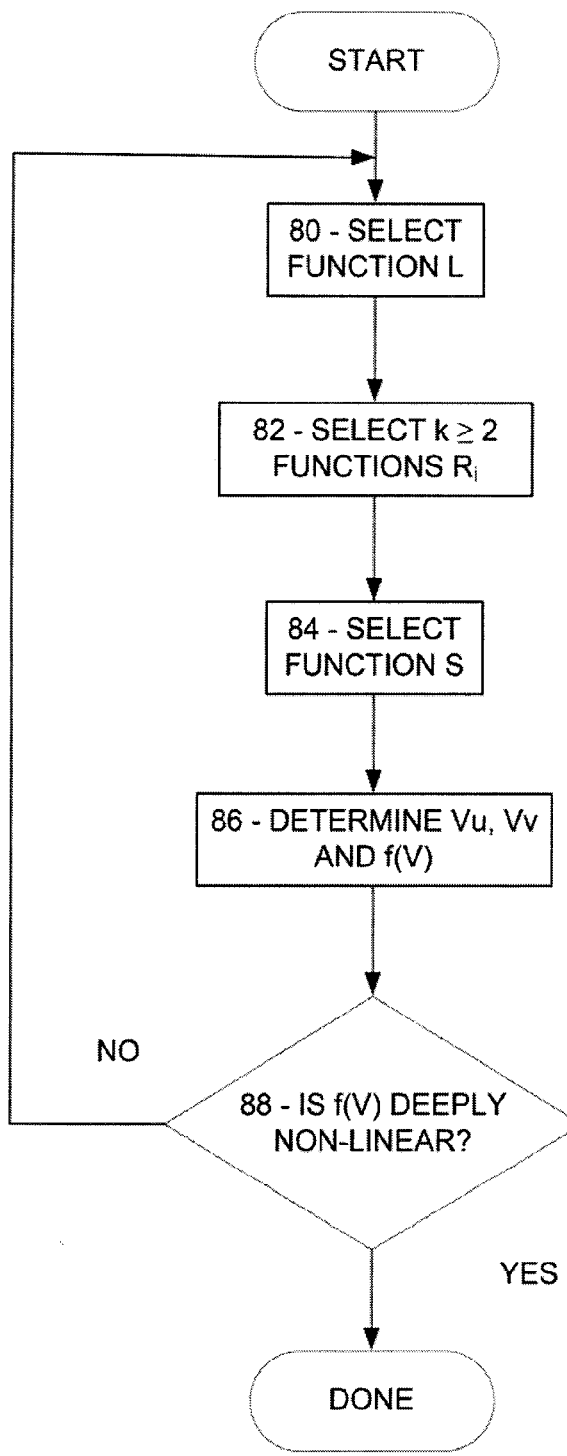
FIG. 8 shows a flow chart of method of performing function-indexed interleaving, in accordance with the present invention.

A further example embodiment and corresponding mathematical treatment of function-indexed interleaving is provided in Section 2.9, and specifically in Section 2.9.2, of the Appendix, and FIG. 8.

Mark I System

Three specific example embodiments are described in detail herein, referred to as the Mark I, II and III systems. An exemplary implementation of the Mark I system is presented in the process flow diagram of FIG. 31. In this example, the square boxes represent mixed Boolean arithmetic (MBA) polynomial encoded matrices. The ambiguity of MBA polynomial data- and operation-encodings is likely to be very high and to increase rapidly with the degree of the polynomial. Each matrix is encoded independently, and the interface encodings need not match. Thus, 2×2 recodings cannot be linearly merged with predecessors and successors. The central construction is function-indexed interleaving which causes the text processing to be text-dependent. Using simple variants with shifts, the number of interleaved functions can be very large with low overhead. For example, permuting rows and columns of 4×4 matrices gives 576 choices. As another example, XORing with initial and final constants gives a relatively very high number of choices. Initial and final recodings mix the entropy across corresponding inputs/outputs of the left fixed matrix and the right selectable matrices. Internal input/output recodings on each matrix raise the homomorphic mapping work factor from order $2^{3w/2}$ to order $2^{5w/2}$ allowing for full 'birthday paradox' vulnerability—the work factor may be higher, but is unlikely to be lower.

Figure 4:
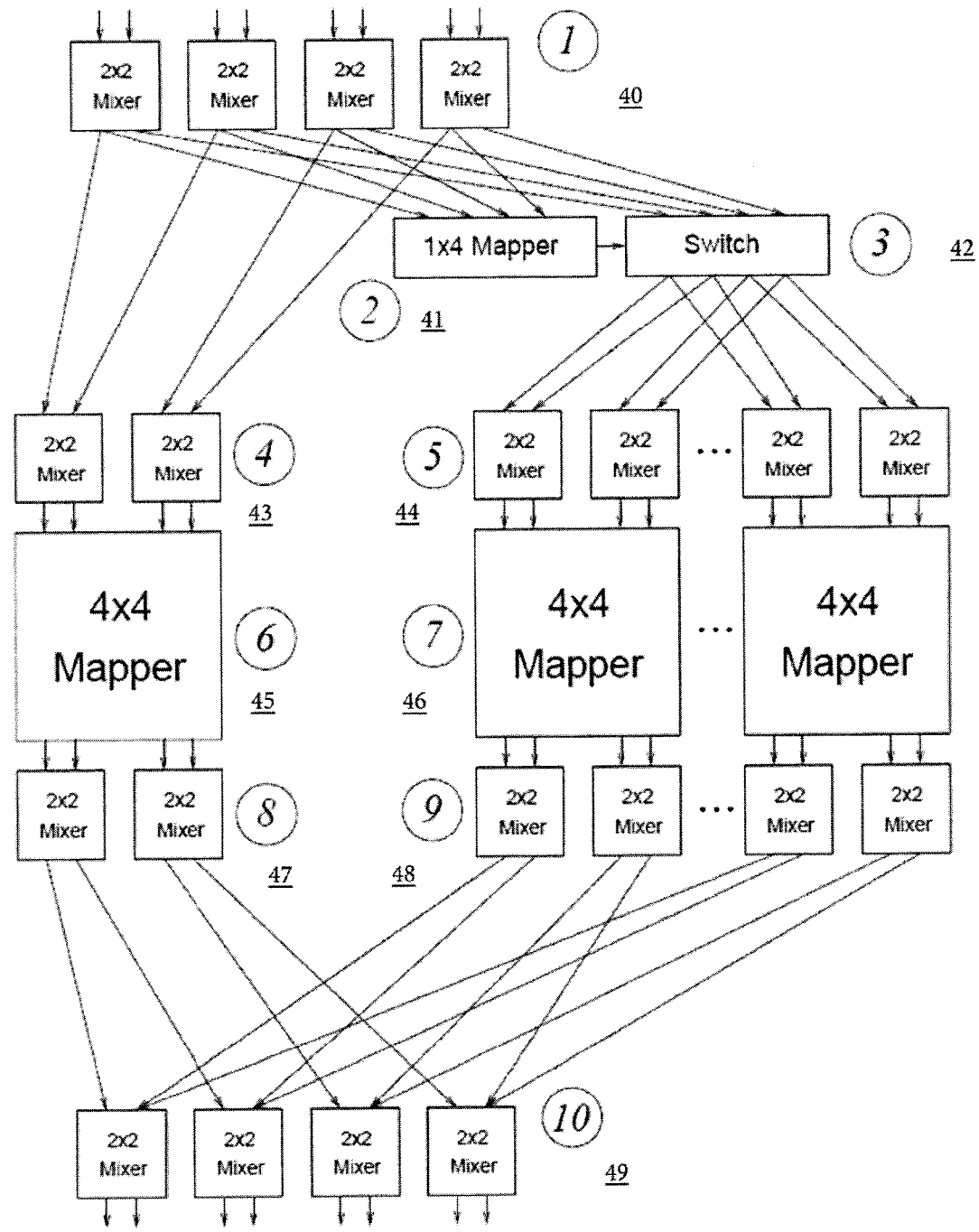
FIG. 4 shows a Mark I 'Woodenman' Construction, in accordance with the present invention.

An example embodiment of a Mark I system and corresponding mathematical treatment is provided in Sections 3.5 and 4 of the Appendix and in FIG. 4.

However, it has been found that a Mark I type implementation may have two weaknesses that can be exploited in some circumstances:

1) Static dependency analysis can be used to isolate the components.
2) Only shift operations and comparisons in the 'switch' are non-T-functions. All of the other components are T-functions and therefore may be recursively analysable using a bit-slice attack.

T-Functions

A function f: $(B^w)^k \to (B^w)^m$ mapping from a k-vector of w-bit words to an m-vector of w-bit words is a T-function if for every pair of vectors $x \in (B^w)^k$, $y \in (B^w)^m$:-$y=f(x)$, with $x' \neq x$ and $y'=f(x')$, and with bits numbered from 0 to w−1 in the w-bit words, the lowest numbered bit in an element word at which y and y' differ is not lower than the lowest numbered bit in an element word at which x and x' differ.

Thus, a function which is a T-function will have the property that a change to an input element's $2^i$ bit never affects an output element's $2^j$ bit when i>j. Typically, the bit-order numbering within words is considered to be from low-order ($2^0$) to high-order ($2^{w-1}$) bits, regarding words as representing binary magnitudes, so this may be restated as: an output bit can only depend on input bits of the same or lower order. So it may be possible to "slice off" or ignore higher bits and still get valid data. Some embodiments also may incorporate tens of millions of T-functions, in contrast to known implementations which only use hundreds of T-functions. As a result, embodiments disclosed herein may be more resistant to bit slicing attacks and statistical attacks.

Functions composable from $\wedge$, $\vee$, $\oplus$, $\neg$ computed over $B^w$ together with +, −, × over $Z/(2^w)$, so that all operations operate on w-bit words, are T-functions. Obscure constructions with the T-function property are vulnerable to bit-slice attacks, since it is possible to obtain, from any T-function, another legitimate T-function, by dropping high-order bits from all words in input and output vectors. The T-function property does not hold for right bit-shifts, bitwise rotations, division operations, or remainder/modulus operations based on a divisor/modulus which is not a power of two, nor does it hold for functions in which conditional branches make decisions in which higher-order condition bits affect the value of lower-order output bits. For conditional branches and comparison-based conditional execution, conditional execution on the basis of conditions formed using any one of the six standard comparisons =, ≠, <, >, ≤, ≥ all can easily violate the T-function condition, and indeed, in normal code using comparison-based branching logic, it is easier to violate the T-function condition than it is to conform to it.

External and Internal Vulnerabilities and Attack-Resistance

By repeatedly applying either of a pair of bijective functions $f_K$, $f_K^{-1}$ where $f_K$, $f_K^{-1}$ are T-functions, it may be possible to precisely characterize the computations using a bit-slice attack. In such an attack, the operation of these functions is considered ignoring all but the low-order bits, and then the low-order two bits, and so on. This provides information until the full word size (e.g., 32 bits) is reached, at which point complete information on how the function behaves may be available, which is tantamount to knowledge of the key K. This is an external vulnerability. While the attack gains knowledge of implementation details, it does so without any examination of the code implementing those details, and could be performed as an adaptive known plaintext attack on a black-box implementation.

A less severe external vulnerability may exist if the functions of the pair have the property that each acts as a specific T-function on specific domains, and the number of distinct T-functions is low. In this case, a statistical bucketing attack can characterize each T-function. Then if the domains can similarly be characterized, again, without any examination of the code, using an adaptive known plaintext attack, an attacker can fully characterize the functionality of a member of the pair, completely bypassing its protections, using only black-box methods. Plainly, it may be desirable to have an effective number of distinct T-functions to foil the above attack. In Mark III type implementations, for example, there are over $10^8$ distinct T-functions per segment and over $10^{40}$ T-functions over all. Mark III type implementations are described in further detail herein.

In some cases, the pair of implementations may include functions which achieve full cascade, that is, every output depends on every input, and on average, changing one input bit changes half of the output bits. An example of an internal vulnerability may occur in a Mark II type implementation where, by 'cutting' the implementation at certain points, it may be possible to find a sub-implementation (a component) corresponding to a matrix such that the level of dependency is exactly 2×2 (in which case the component is a mixer matrix) or 4×4 (in which case it is one of the L, S, or R matrices). Once these have been isolated, properties of linear functions allow very efficient characterization of these matrices. This is an internal attack because it requires non-black-box methods: it actually requires examination of internals of the implementations, whether static (to determine the dependencies) or dynamic (to characterize the matrices by linearity-based analyses).

As a general rule, the more external attacks are prevented, and a potential attacker is forced to rely on increasingly fine-grained internal attacks, the harder the attacker's job becomes, and most especially, the harder the attacks become to automate. Automated attacks are especially dangerous because they can effectively provide class cracks which allow all instances of a given technology to be broken by tools which can be widely distributed.

Thus embodiments disclosed herein may provide, by means of variable and increasingly intricate internal structures and increasingly variegated defenses, an environment in which any full crack of an instance requires many sub-cracks, the needed sub-cracks vary from instance to instance, the structure and number of the attacked components varies from instance to instance, and the protection mechanisms employed vary from instance to instance. In this case, automating an attack becomes a sufficiently large task to discourage attackers from attempting it. In the substantial time it would take to build such an attack tool, the deployed protections may have been updated or otherwise may have moved on to a new technology for which the attack-tool's algorithm no longer suffices.

Mark II System

Figure 5:
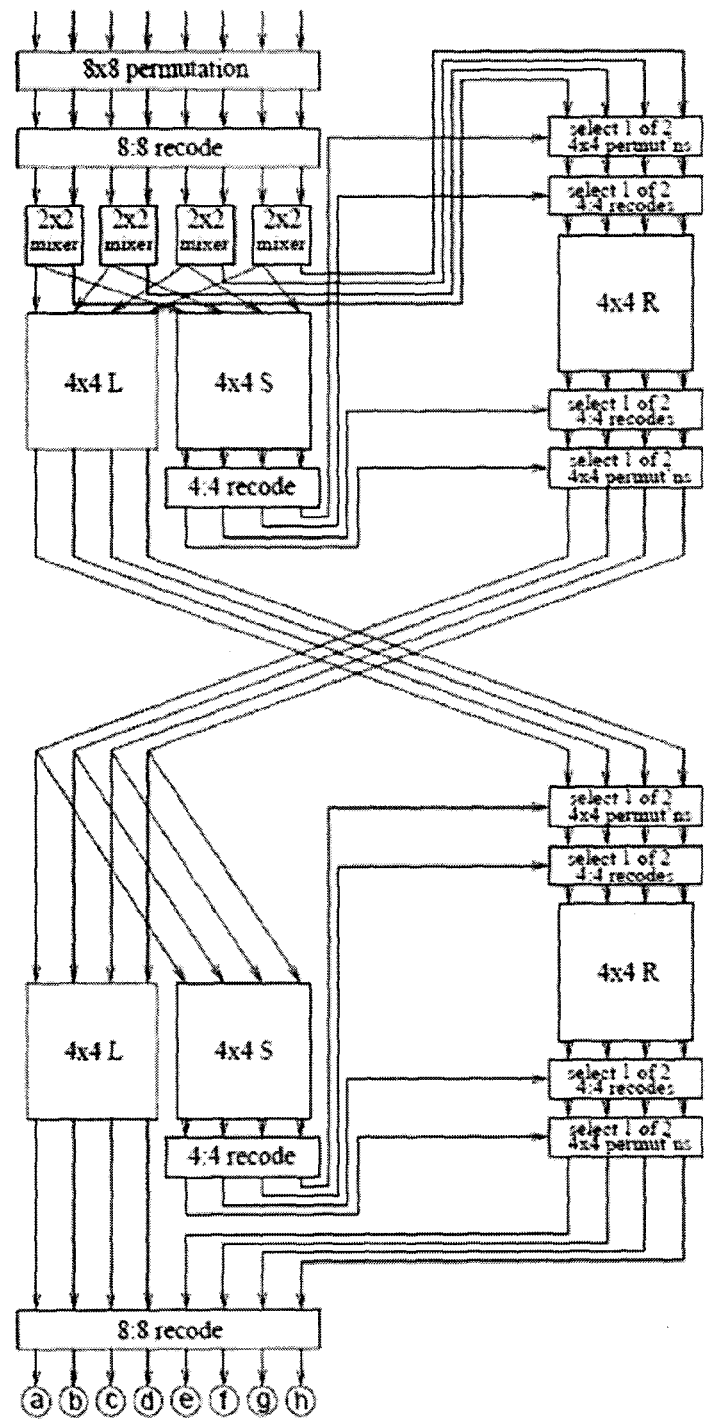
FIGS. 5 and 6 show the first and second half respectively, of a Mark II Construction, in accordance with the present invention.
Figure 6:
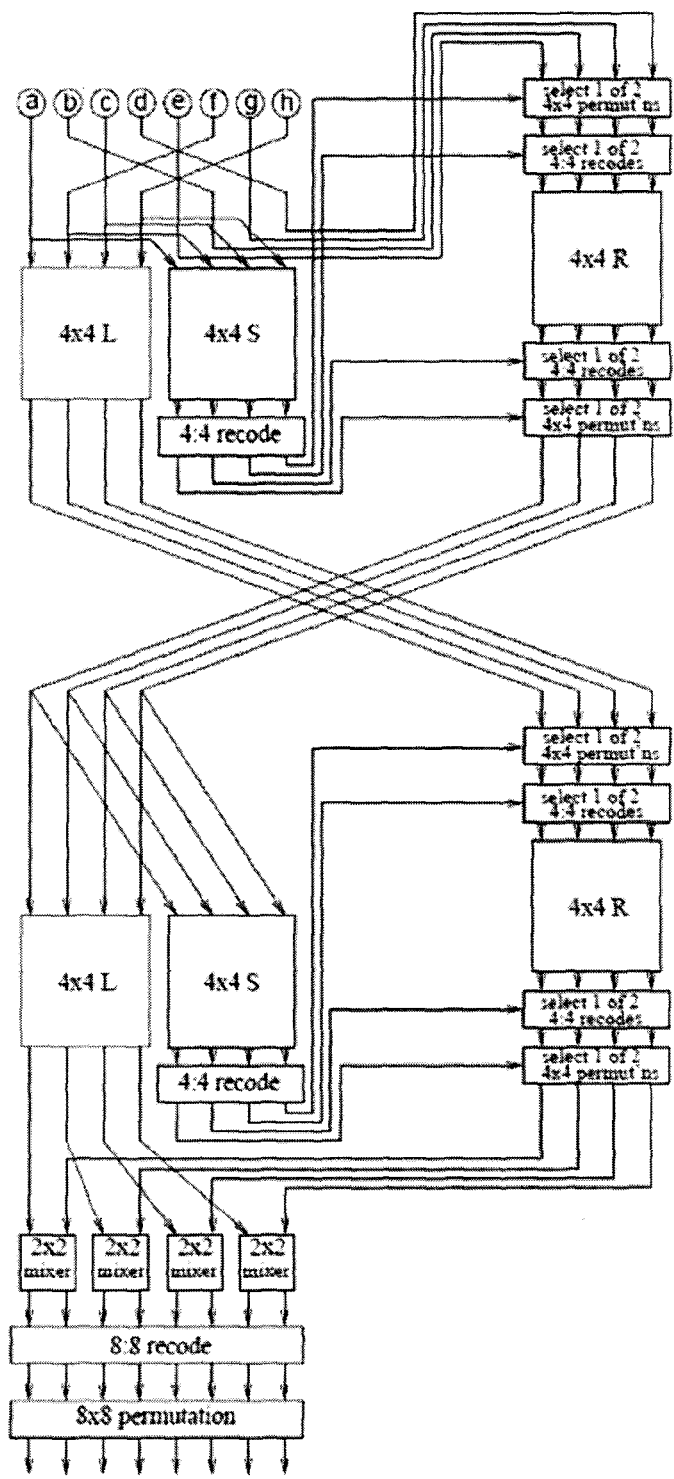
Figure 12:
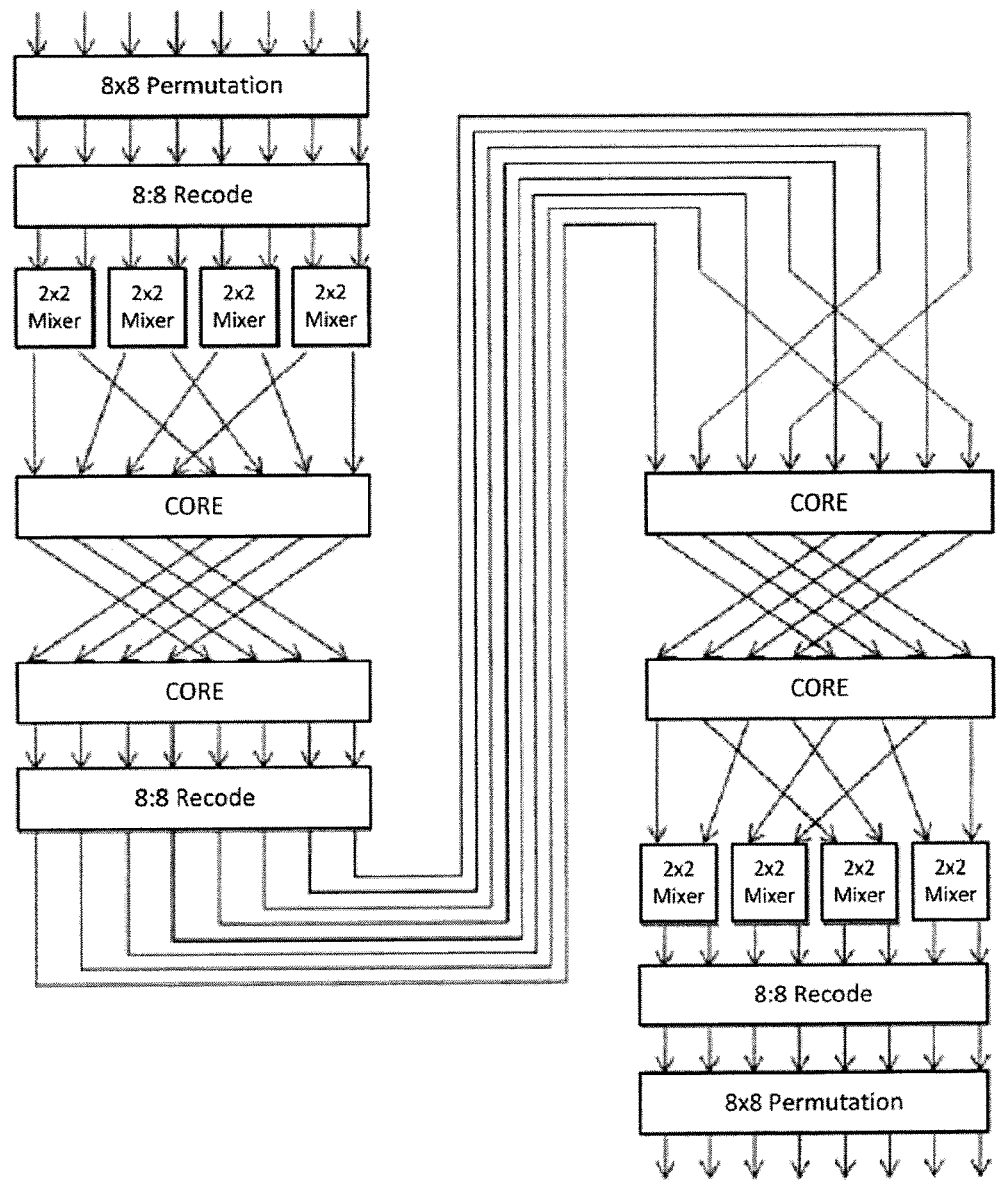
FIG. 12 presents a process flow diagram for implementation of the Mark II protection system of the invention.
Figure 23:
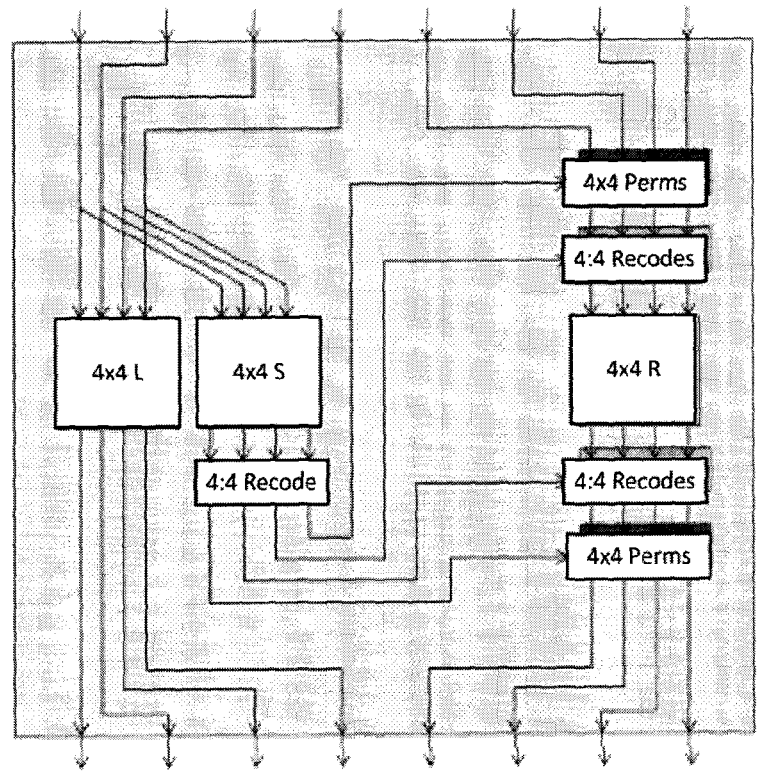
FIG. 23 presents a process flow diagram for implementation of the Mark II protection system of the invention.

A block diagram of an example Mark II type implementation according to an embodiment is presented in FIGS. 23 and 12. FIG. 23 presents the processing of a "base core function" which appears four times in FIG. 12. The complete execution flow for a Mark II type system is shown in FIGS. 5 and 6, and described in further detail with reference to FIGS. 5 and 6 in Section 5.1 of the Appendix.

In an implementation according to a Mark II type embodiment, explicit use of recoding is part of the functionality chosen by K. Right-side recodes and permutations are chosen text-dependently from pairs for a total of 16 configurations per core and 65,536 configurations over all. However, a T-function count of 65,536 over all may be much too low for many cases; even a blind bit-slice attack, which ignores the internal structure and uses statistical bucketing, might suffice to crack the Mark II implementation given sufficient attack time.

The balance of a Mark II type implementation is shown in FIG. 12. Initial and final permutations and recodes as shown are statically chosen at random. Swapping sides between cores 1 & 2 and between cores 3 & 4, and half-swapping between cores 2 & 3, ensure text dependence across the entire text width. However, the highly regular structure facilitates component-isolation by interior dependency analysis. Once the components are isolated, the T-functions can be analysed by bit-slice analysis. The non-T-function parts are simple and can be cracked using straightforward attacks. Thus, the Mark II implementation is effective and is useful in many applications, but could be compromised with sufficient access and effort.

The Mark II proposal is similar to Mark I in that it has a fixed internal structure, with only coefficient variations among the base function implementation pairs. Further description regarding the example embodiment of a Mark II implementation and a corresponding mathematical treatment is provided in Section 5.1 of the Appendix.

Mark III System

In contrast to the Mark I and Mark II implementations described above, a Mark III base function design according to an embodiment disclosed herein may include the following properties:

an irregular and key-determined structure, so that the attacker cannot know the details of the structure in advance;

highly data-dependent functionality: varying the data varies the processing of the data, making statistical bucketing attacks resource-intensive;

a relatively extremely high T-function count (the number of separate sub-functions susceptible to a recursive bit-slice attack), making a blind bit-slice attack on its T-functions infeasible;

redundant and implicitly cross-checked data-flow, making code-modification attacks highly resource-intensive; and omni-directional obfuscation-induced dependencies, making dependency-based analysis resource-intensive.

Figure 13:
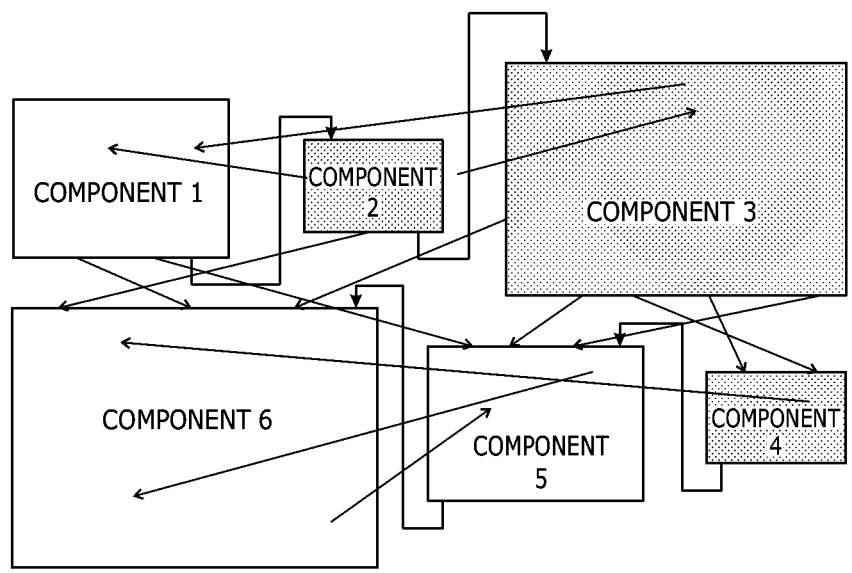
FIG. 13 shows a graphical representation of the irregular structure of segment design in a Mark III implementation of the invention.
Figure 14:
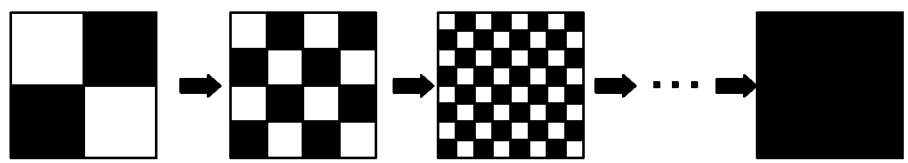
FIG. 14 shows a graphical representation of the granularity that may be achieved with T-function splitting in a Mark III implementation of the invention.

FIG. 13 shows a schematic representation of execution flow in a portion of an example Mark III type implementation. Similar to the example execution flows described with respect to the Mark I and Mark II type implementations, each component may represent a function, process, algorithm or the like, with arrows representing potential execution paths between them. Where different arrows lead to different points within the components, it will be understood that different portions of the component may be executed, or different execution paths within the component may be selected. As shown in FIG. 13, a Mark III type implementation may provide an irregular, key-dependent, data-dependent, dataflow-redundant, cross-linked, cross-checked, tamper-chaotic structure, containing a nested function-indexed-interleaving within a function-indexed interleaving. Cross-linking can be omnidirectional because right-side selection depends on the inputs, not the outputs, of the left-side in each interleaving, so that simple code reordering within each segment allows right-to-left cross connections as well as left-to-right ones. As shown in FIG. 14, Irregular Extremely fine-grained T-function splitting makes overall T-function partitioning attack ineffective.

Figure 15:
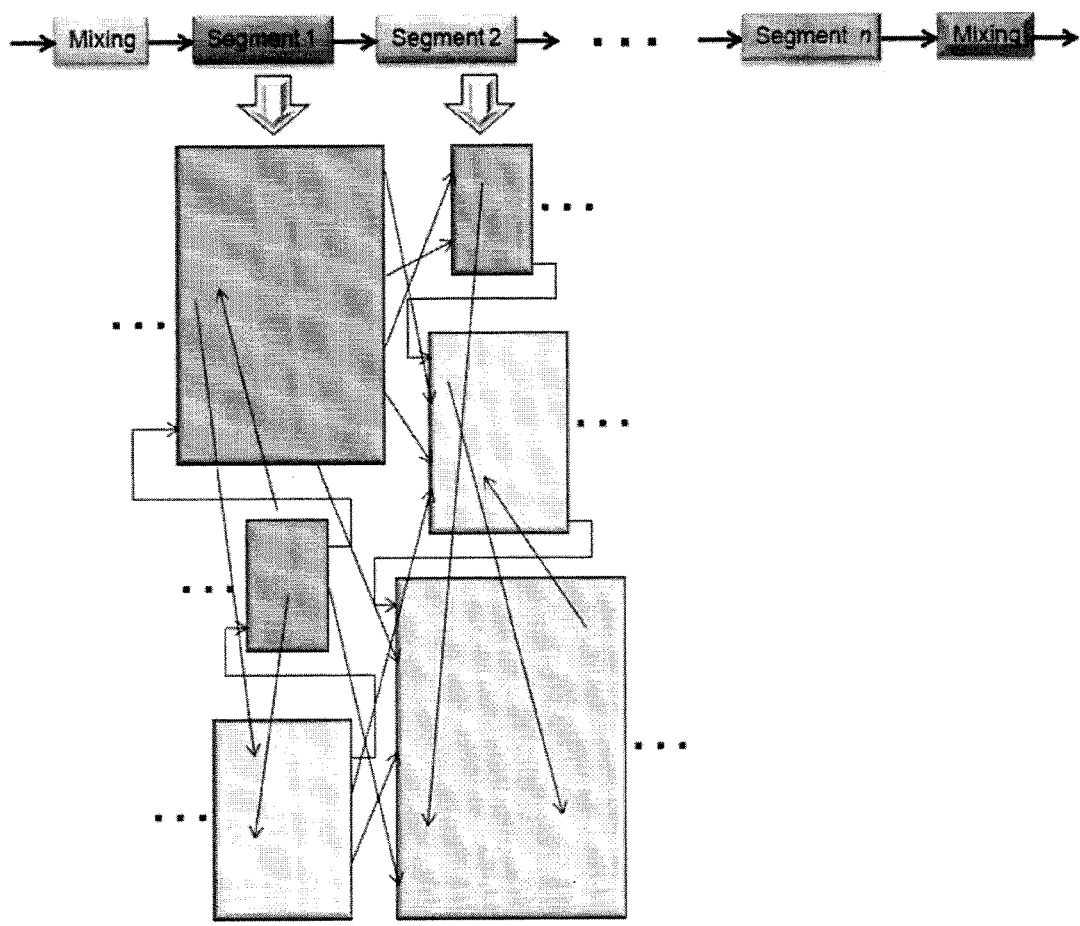
FIG. 15 shows a graphical representation of the overall structure of a Mark III implementation of the invention.

FIG. 15 shows another example schematic of a portion of a Mark III type implementation as disclosed herein. As shown in FIG. 15, the initial and final mixing may use linear transforms of 32-bit words having widths of 3 to 6. Five to seven segments may be are used, each of which contains a 3-band recursive instance of function-indexed interleaving. Each band is 3 to 6 elements wide, with a total of 12 elements for all three bands. Matrices are I/O permuted and I/O rotated, giving over 100 million T-subfunctions per segment: the whole base function has over $10^{40}$ T-subfunctions. Dataflow duplication, random cross-connection, and random checks, combined with code-reordering also may be used, creating omni-directional cross-dependencies.

Figure 16:
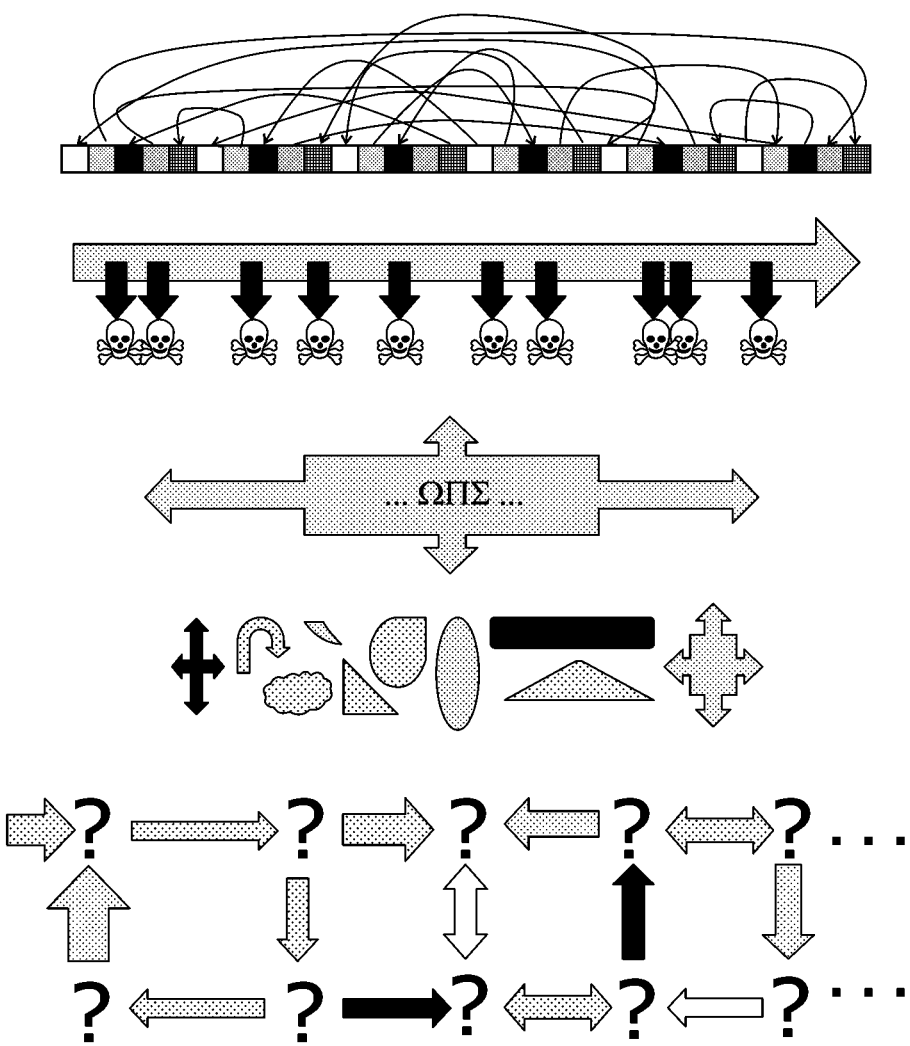
FIG. 16 shows a graphical representation of the defensive layers of a Mark III implementation of the invention.

A number of the different defenses that may be used in a Mark III type system are shown graphically in FIG. 16. They include features such as the following:

memory-shuffling with fractured transforms (dynamic data mangling) which hides dataflow;

random cross-linking, cross-trapping, and variable-dependent coding which causes pervasive inter-dependence and chaotic tamper response;

permutation polynomial encodings and function-indexed interleaving which hobble linear attacks;

variable, randomly-chosen structure which hobbles advance-knowledge attacks; and functionality is highly dependent on run-time data, reducing repeatability and hobbling statistical bucketing attacks.

Further details regarding a Mark III type implementation are provided in Section 6 of the Appendix. A related process for creating an invertible matrix over $Z/(2^w)$ is provided in Section 3.3 of the Appendix. As shown and described, initial and/or final mixing steps also may be used, examples of which are provided in Section 2.8 of the Appendix.

Figure 11:
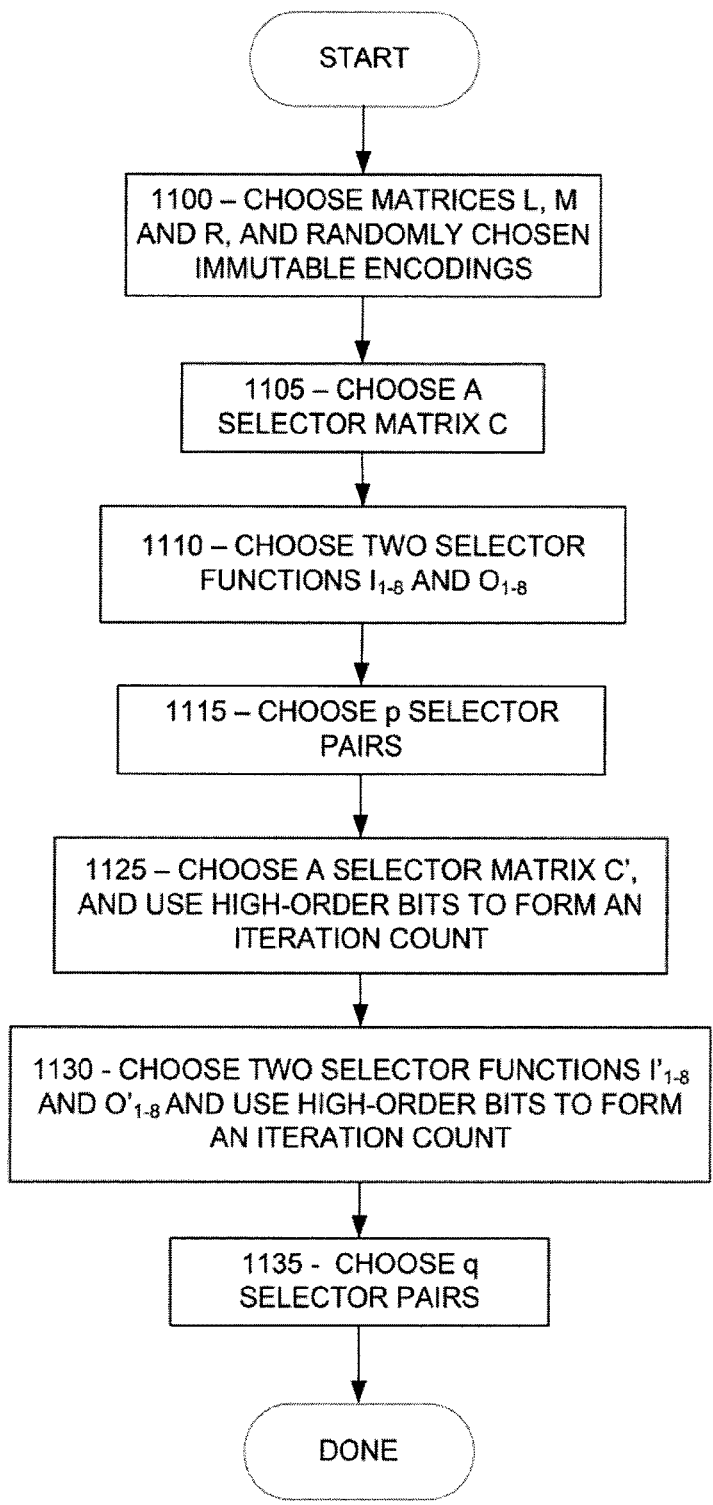
FIG. 11 shows a flow chart of method of creating $f_K$ segments, in accordance with the present invention.

By replacing conditional swaps with 2×2 bijective matrices mixing each input into each output, we can take precisely the same network topology and produce a mixing network which mixes every input of a base function with every other initially, and we can employ another such network finally to mix every output of the base function with every other. As noted above the mixing is not entirely even, and its bias can be reduced with conditional swaps replaced by mixing steps. A segment's input and output vectors also may be subdivided, for example as described in further detail in Sections 6.2.3-6.2.7 of the Appendix, and as illustrated in FIG. 11.

Data-Flow Duplication

Some embodiments may include data flow duplication techniques. For example, as described below, for every instruction which is not a JUMP . . . , ENTER, or EXIT, the instruction may copied so that an original instruction is immediately followed by its copy, and new registers may be chosen for all of the copied instructions such that, if x and y are instructions, with y being the copy of x, 1) if x inputs the output of an ENTER instruction, then the corresponding y input uses the same output;

2) if x inputs the output of an original instruction u with copy v, then the corresponding input of y inputs from the v output corresponding to the u output from which x inputs; and 3) if x outputs to an EXIT instruction, then the corresponding output of y outputs to a special unused sink node indicating that its output is discarded.

Thus, all of the computations except for the branches have an original and a copy occurrence.

To accomplish this transformation, we proceed as follows.

We add a new instruction JUMPA ('jump arbitrarily'), which is an unconditional branch with two destinations in control-flow graph (cfg) form, just like a conditional branch, but with no input: instead, JUMPA chooses between its two destinations at random. JUMPA is not actually part of the VM instruction set, and no JUMPA will occur in the final obfuscated implementation of $f_K$ or $f_K^{-1}$.

We use JUMPA in the following transformation procedure:

1) If the implementation is not in SMA (static multi-assignment) form already, convert it to SMA form;

2) For each of BB $X_i$ of the BB's in the implementation $X_1, \ldots, X_k$, replace it with three BBs $C_i$, $X_i$, $X'_i$ by creating a new BB $X'_i$ which is identical to $X_i$, and adding a new BB $C_i$ which contains only a single JUMPA instruction targeting both $X_i$ and $X'_i$, making $X_i$ and $X'_i$ the two targets of $C_i$'s JUMPA, and making every non-JUMPA branch-target pointing to $X_i$ point to $C_i$ instead.

3) Convert the implementation to SSA form (static single assignment), isolating the local data-flow in each $X_i$ and $X'_i$, although corresponding instructions in $X_i$ and $X'_i$ still compute identical values.

4) Merge all of the code in each $X'_i$ back into its $X_i$, alternating instructions from $X_i$ and $X'_i$ in the merge so that corresponding pairs of instructions are successive: first the $X_i$ instruction, and then the corresponding $X'_i$ instruction.

5) Make each branch-target which is a $C_i$ point to the corresponding $X_i$ instead, and remove all of the $C_i$ and $X'_i$ BBs. At this point, the data-flow has been duplicated, the original shape of the CFG has been restored, and the implementation is free of JUMPA instructions. Remember which instructions correspond in each $X_i$ for future use.

Figure 9:
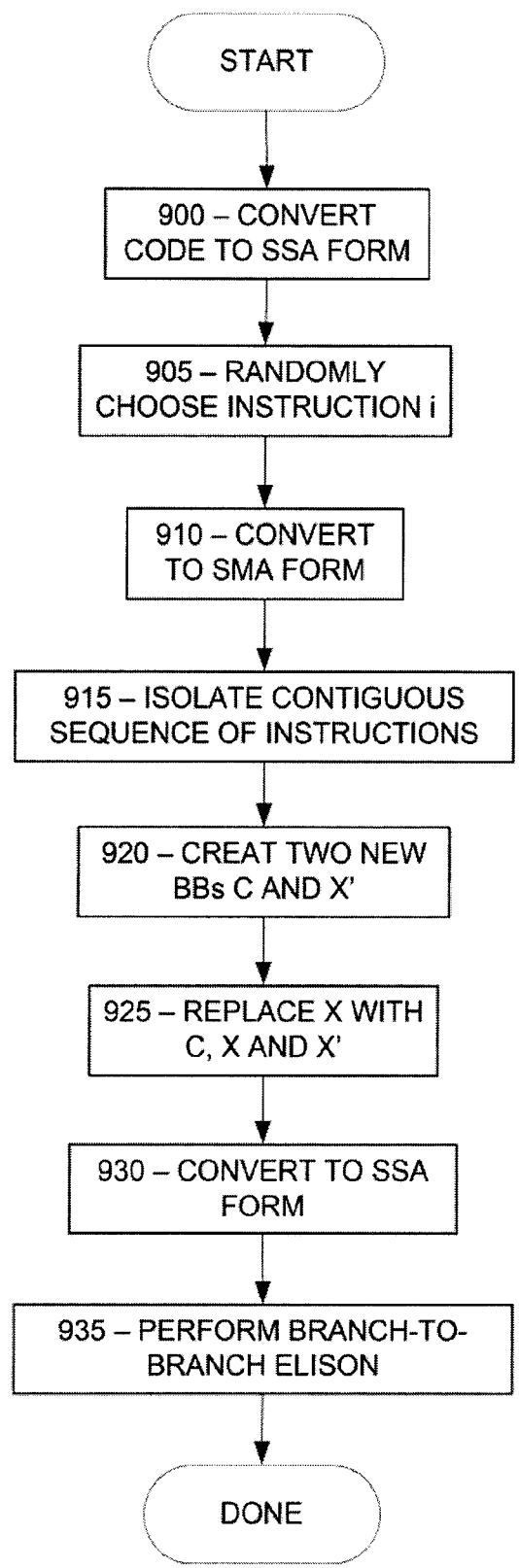
FIG. 9 shows a flow chart of method of performing control-flow duplication, in accordance with the present invention.

Further details regarding control flow duplication are provided in Section 5.2.6 of the Appendix, and described with respect to FIG. 9, which shows an example process for control flow duplication according to embodiments disclosed herein.

Fractures and Fracture Functions

Generally when an encoded output is produced, it is consumed with exactly the same encoding assumed, so that an encoded operation z=f(x, y) becomes z'=f' (x', y') where (x', y', z')=($e_x(x)$, $e_y(y)$, $e_z(z)$), for encodings $e_x$, $e_y$, $e_z$, and where f'=$e_z \circ f \circ [e_x^{-1}, e_y^{-1}]$.

In some embodiments, it may be advantageous to output a value with one encoding, and subsequently input assuming some other encoding. If x is output as $e_1(x)$, and later consumed assuming encoding $e_2$, in effect we have applied $e_2^{-1} \circ e_1$ to the unencoded value. Such an intentional mismatch between the encoding in which a value is produced and the encoding assumed when it is consumed is referred to herein as a "fracture." If the encodings are linear, so is the fracture function $e_2^{-1} \circ e_1$, and if they are permutation polynomials, so is the fracture function $e_2^{-1} \circ e_1$.

In some embodiments, fractures may be useful in obfuscation because the computation which they perform effectively does not appear in the encoded code—the amount and form of code to perform a normal networked encoding and one which adds an operation by means of a fracture is identical, and there appears to be no obvious way to disambiguate these cases, since encodings themselves tend to be somewhat ambiguous.

Note that the defining property of a fracture is the fracture function, for example $v^{-1} \circ u$. Generally, there are many different choices of consuming encoding v and producing encoding u which produce exactly the same fracture function. It is quite possible, for example, to have $u_1, \ldots, u_k, v_1, \ldots, v_k$ such that $v_i^{-1} \circ u_i$ is the same fracture function for i=1, ..., k. Thus, specifying the fracture function does not necessarily specify the producing and consuming encodings which imply it.

Data Scrambling via Mass Data Encoding

Mass Data Encoding (MDE) is described in U.S. Pat. No. 7,350,085, the contents of which are incorporated herein by reference. In short, MDE scrambles memory locations in a hash-like fashion, dynamically recoding memory cells on each store and dynamically recoding and relocating memory cells by background processing. By mismatching fetch and store recodings, a fetch or store can perform an add or multiply while continuing to look like a simple fetch or store. This makes it hard for an attacker to disambiguate between mere obfuscation and useful work.

Figure 17:
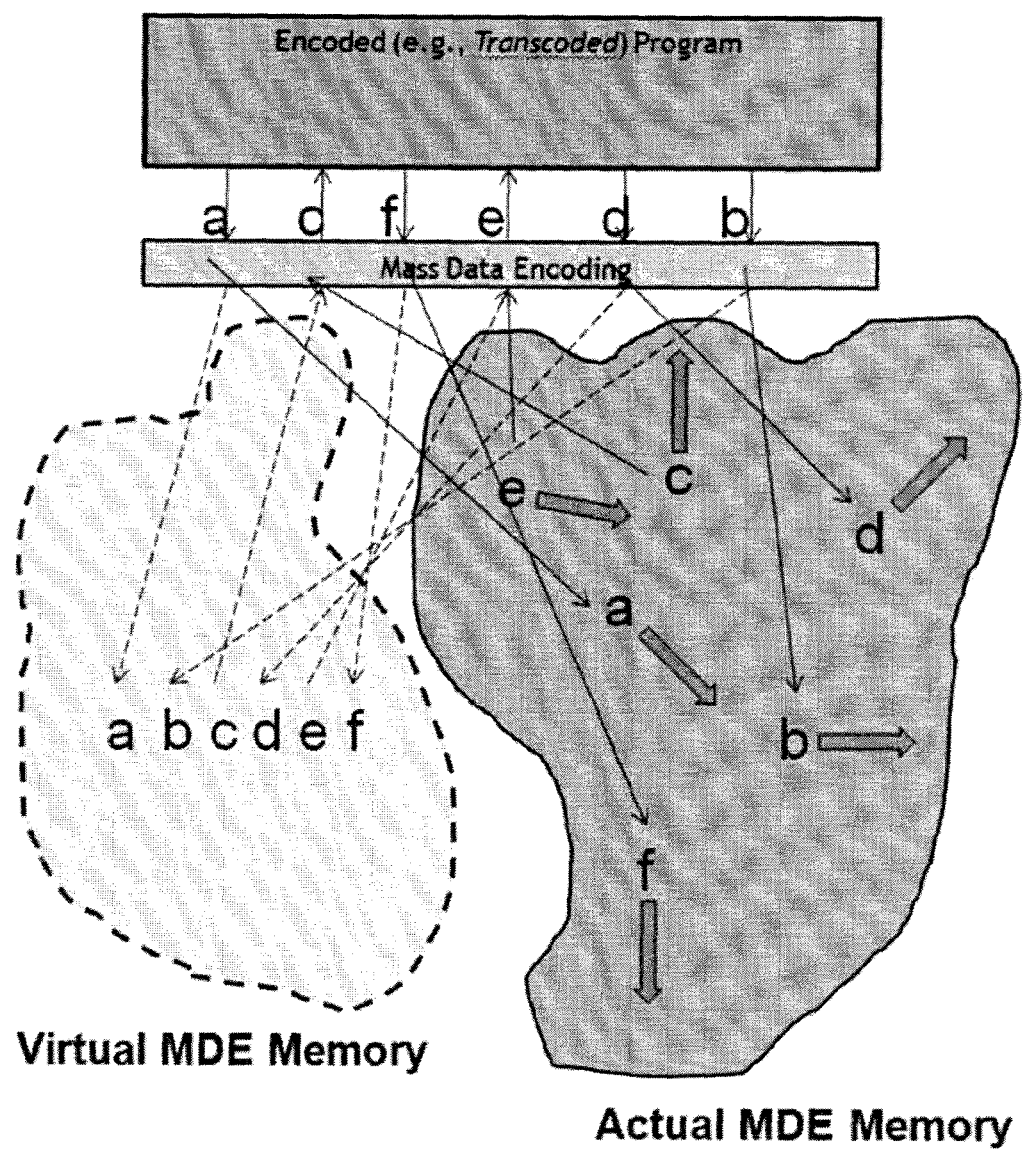
FIG. 17 shows a graphical representation of mass data encoding in an implementation of the invention.

MDE is compiled, not just interpreted, so supporting data structures are partially implicit and hence, well-obscured. Actual addresses are always scrambled and rescrambled by background activity. As shown in FIG. 17, the code accessing the Virtual MDE memory is initially written as if it were accessing an ordinary piece of memory. The code is then modified by the methods described in U.S. Pat. No. 7,350,085 to employ a mapping technique which encodes both the data and locations in the memory. Thus, the locations accessed move around over time, and the encodings applied to the data likewise change over time, under the feet of the running code. This technique of protection has substantial overhead, but its highly dynamic nature makes it arduous for an attacker to penetrate the meaning of software which uses it. Cells are recoded when stored, and are recoded periodically by background activity. Mismatching recode on store and corresponding recode on fetch can do a covert add or multiply (key-controllable). Fetched items are recoded, but not to smooth (i.e., not to unencoded). Stored items are not smooth prior to store, and are recoded on store to a dynamically chosen new cell encoding. Stored data are meaningless without the code which accesses them. One program can have any number of distinct, nonoverlapping MDE memories. An MDE memory can be moved as a block from one place to another or can be transmitted from one program to another via a transmission medium. That is, messages of sufficient bulk can be transmitted in MDE-memory form.

The initial state of the memory is not produced by hacker-visible activity, and hence conceals how its contents were derived. That is, the initial state is especially obscure.

Control Confusion Via Control Flow

Control Flow Encoding (CFE) is described in U.S. Pat. No. 6,779,114, the contents of which are incorporated herein by reference. CFE combines code-fragments into multi-function lumps with functionality controlled by register-switching: many-to-many mapping of functionality to code locations; execution highly unrepeatable if external entropy available: the same original code turns into many alternative executions in CFE code. By modifying the register-switching and dispatch code, key information can control what is executed and therefore control the computation performed by embodiments of the invention.

Figures 18, 19:
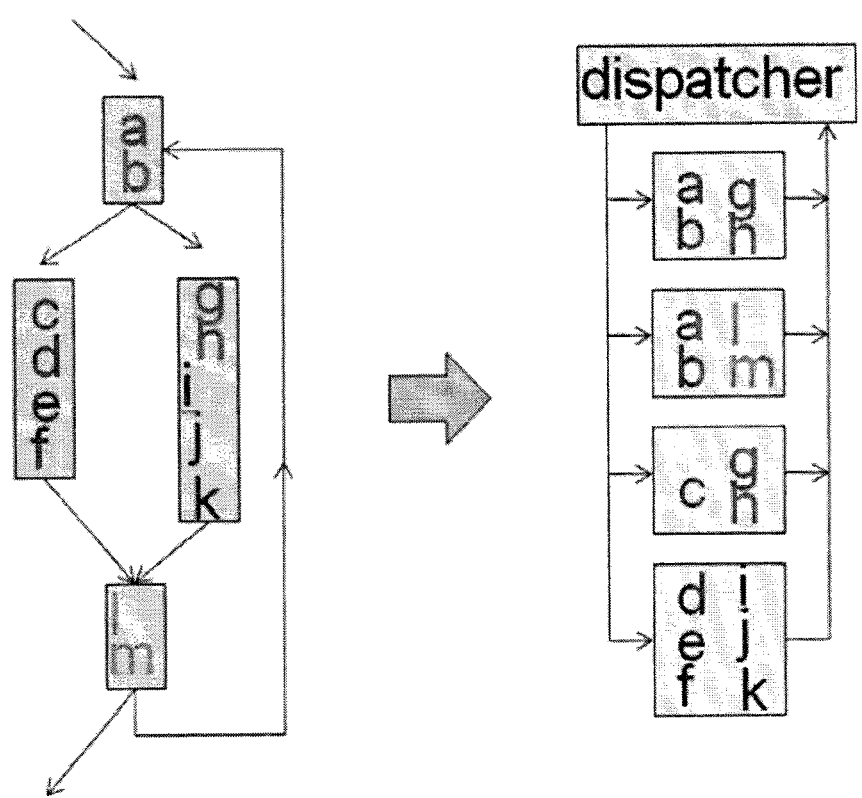
FIGS. 18 and 19 show graphical representations of control flow encoding in an implementation of the invention.

Code represented by the control-flow graph of FIG. 18, where the letters denote code fragments, can be encoded as shown in FIG. 19. The protected control-flow encoding shows lumps created by combining pieces, executed under the control of the dispatcher, with the 'active' piece(s) selected by register switching.

CFE is compiled, not just interpreted, so supporting data structures are partially implicit, and hence, well-obscured. Lumps combine multiple pieces; that is, they have multiple possible functionalities. When a lump is executed, which piece(s) is/are active is determined by which operate via registers pointing to real data, not dummy data. The same piece may occur in multiple lumps, with different data-encodings: mapping from functionalities to code-locations is many-to-many.

The dispatcher can be arranged to select pieces which embody a background process, making it hard to distinguish background and foreground activity. Available entropy is used to determine which alternative way of executing a sequence of pieces is employed, providing dynamic execution diversity (nonrepeating execution). As well, key information can be used to influence dispatch and hence vary the represented algorithm.

Dynamic Data Mangling

Figure 20:
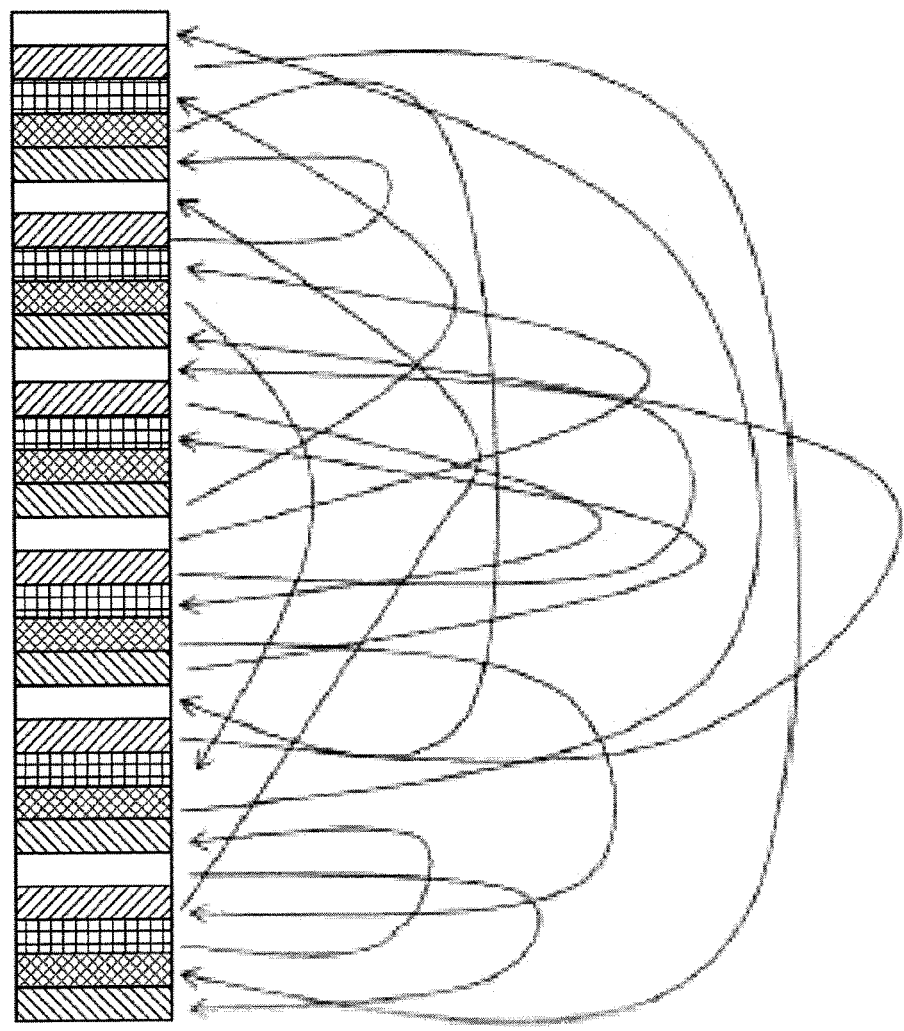
FIG. 20 shows a graphical representation of dynamic data mangling in an implementation of the invention.

As shown in FIG. 20 re-use of M-registers may be maximized, allocating separate M-registers only where required, using Chaitin's graph-coloring allocation algorithm. As a result, M-registers are re-used frequently, making data-flow harder for attackers to follow.

To do so, first a modulus M, a permutation polynomial p over the mod-M ring, an input-based 1×n vector mapping matrix A yielding z from the inputs, and a series of constant $c_i = p(z+i)$ for $1 \le i \le M$, may be selected, where the $c_i$ values are distinct since p is a mod-M perm-polynomial. Locations $c_1, \ldots, c_n$ (with $n \le M$) are treated in an array X of size M as 'M-registers'.

During computation, data may be moved randomly into and out of M-registers, and from M-register to M-register, changing encoding at each move. Some embodiments also may randomly cause either the encodings to form an unbroken sequence, or may inject fractures as disclosed herein where encodings do not match.

Given a fracture with data in encoding e1, the input is assumed to be in encoding e2, thus computing the fracture function $e3 = e2 - 1 \circ e1$. If e1, e2 are linear, so is e3. If e1, e2 are permutation polynomials, so is e3. The code has identical form whether a fracture is present or not; i.e., it is ambiguous whether or not a fracture is present. Thus, as previously described, fractures may provide a means of injecting hidden computations such that the code looks much the same before and after it is added.

Additional details and mathematical treatment of the use of dynamic data mangling is provided in Section 7.8.14 of the Appendix.

Cross-Linking and Cross-Trapping

Figure 21:
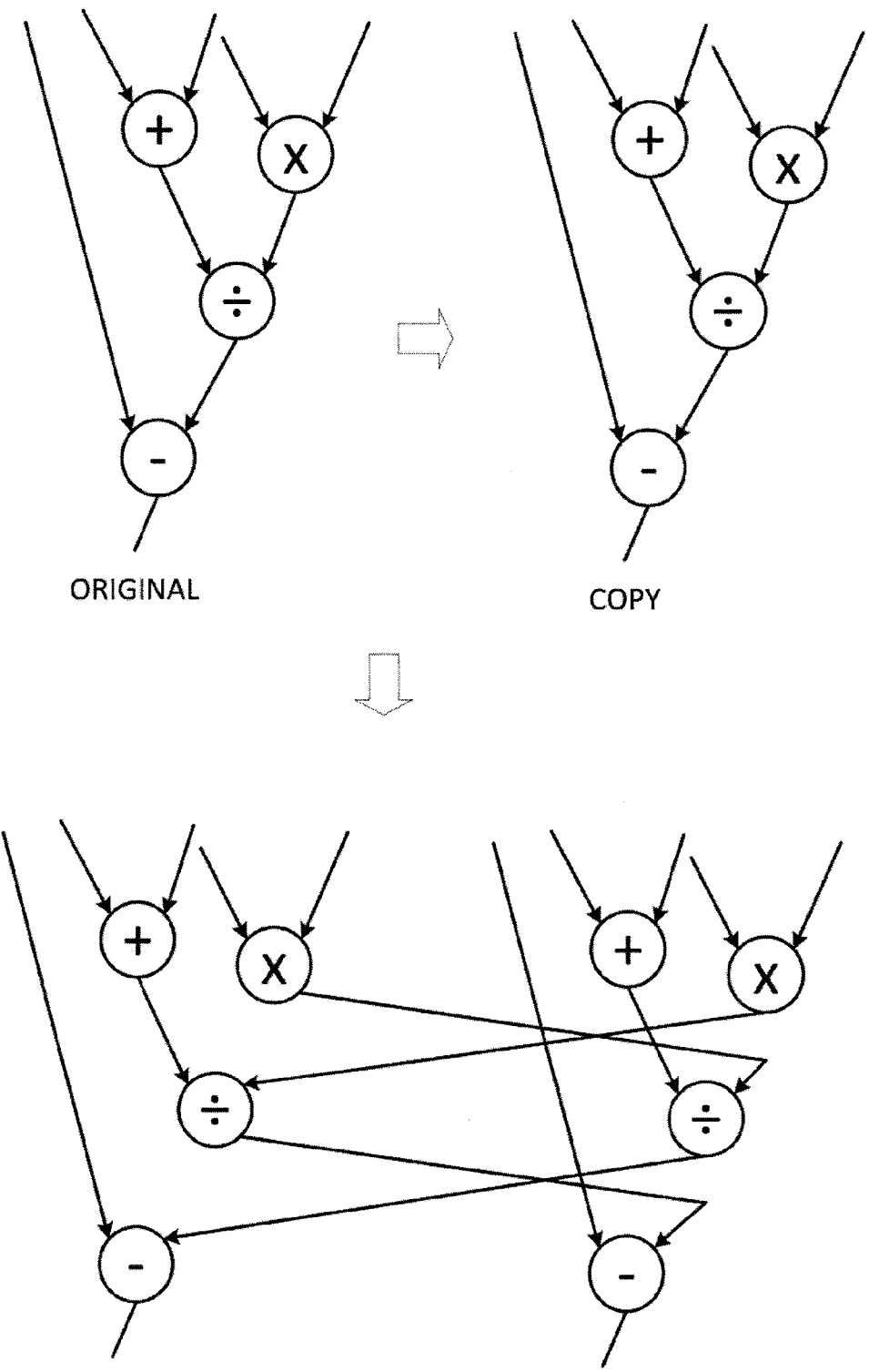
FIG. 21 shows a graphical representation of cross-linking and cross-trapping in an implementation of the invention.

The generous application of cross-linking and cross-trapping can provide aggressive chaotic response to tampering and perturbation attacks, with much stronger transcoding and massive static analysis resistance. In an embodiment, cross-linking and cross-trapping may be effected as follows, as illustrated in FIG. 21:

1) copy computations at least once;
2) randomly swap connections between the original and the copy. Because they are duplicates, the results will not change;
3) encode all of the resulting computations so that duplicates are independently encoded;
4) randomly take duplicate results and inject computations adding their difference (=0) or multiplying one by the ring inverse of the other (=1) and then adding the 0 or multiplying by the 1 (in encoded form). The injected encoded 0-adds and 1-multiplies have no functional effect unless tampering occurs, in which case the code behaves chaotically.

An added benefit is that the static dependency graph becomes much denser than that for the original program, making static analysis attacks difficult. Thus, effective tampering requires that the (differently encoded) duplicates be correctly identified and the correct duplicates be changed in effectively the same way under different encodings. This is much harder to accomplish than ordinary tampering without cross-linking and cross-trapping.

Figure 10:
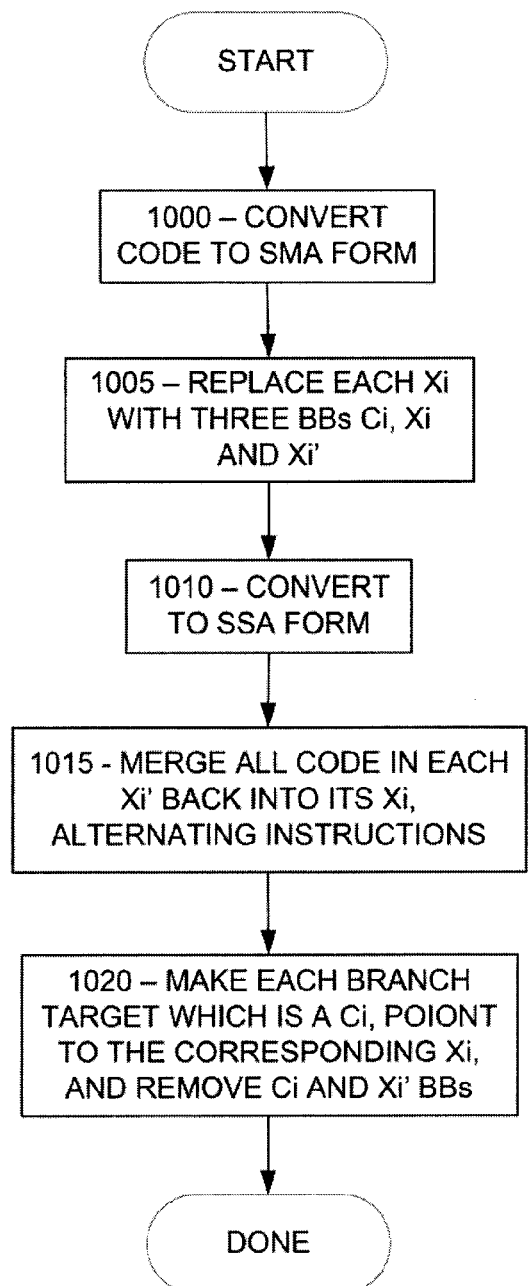
FIG. 10 shows a flow chart of method of performing data-flow duplication, in accordance with the present invention.

An example implementation of data-flow duplication is provided in Section 5.2.8-5.2.10 of the Appendix, and illustrated in FIG. 10. In addition to its normal use within the entry and exit base-functions, data flow duplication and cross-checking or trapping also may be performed using these transformations for the data-flow within the decision-block including the transfer of information from the outputs of the entry base-function to inputs of the decision-block and the transfer of information from the outputs of the decision-block to the inputs of the exit base-function.

Context-Dependent Coding

In some embodiments, the context in which base function pairs are implemented may be an integral part of the operation of the base-function. Context includes information from the application, hardware, and/or communication. Context of one base-function component can also include information from other components, which are part of the application in which it resides.

Figure 22:
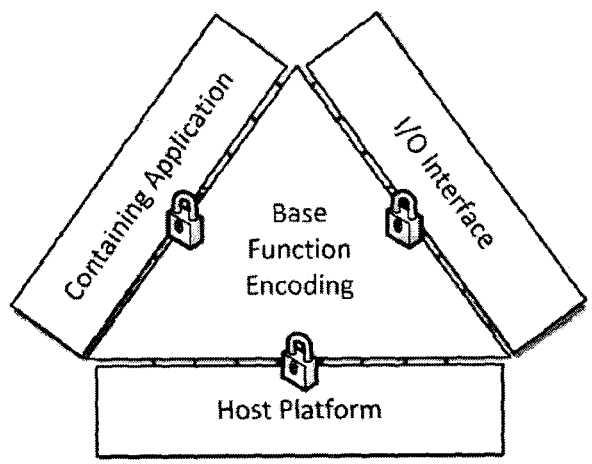
FIG. 22 shows a graphical representation of context dependent coding in an implementation of the invention.

Referring to FIG. 22, an implementation of a base-function pair or a similar construct may be hosted on a platform from which hardware or other platform signature constants can be derived and on which the implementation can be made to depend. It may be preferred for the implementation to reside in a containing application from which an application signature or other application constants can be derived and on which the implementation can be made to depend.

The implementation may also take inputs from which further constant signature information can be derived and on which the implementation can be made to depend.

Biased Permutations Via Sorting Networks

Permutations may provide a basis for storing enormous numbers of alternatives in limited space. For example, row/column permutations may be used to turn a non-repeating 4×4 matrix into 576 non-repeating 4×4 matrices. In some embodiments, the order of computations may be permuted, deep dependence of computations on run-time data may be generated, and the like.

Figure 7:
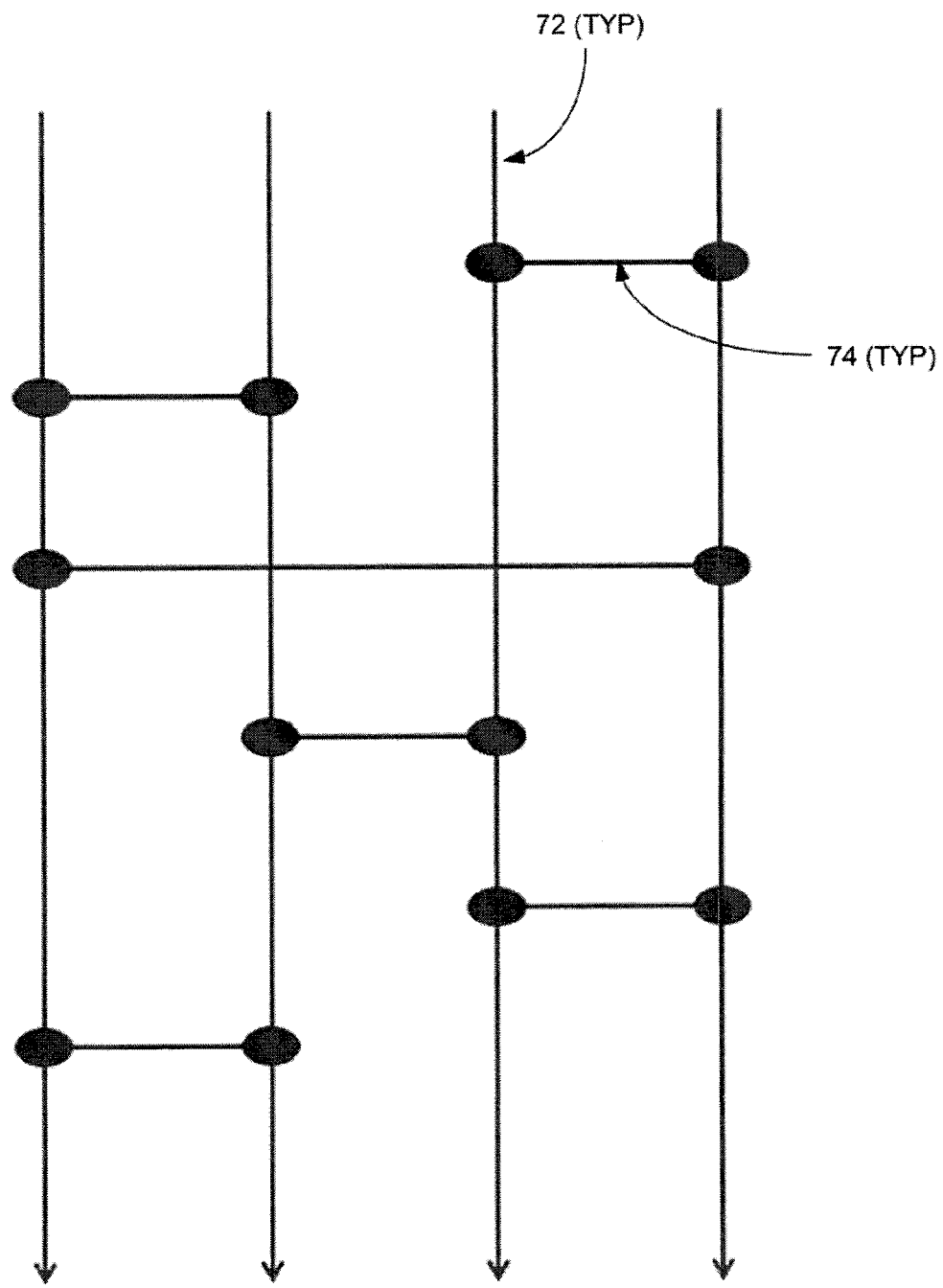
FIG. 7 shows a graphical representation of a sorting network, in accordance with the present invention.

Referring to FIG. 7, some embodiments may first sort, at each cross-link, compare, and swap on greater-than. To permute, swaps are performed with probability ½. It is easy to show that if the network sorts correctly with a compare-swap, then it permutes with random swap with the full range of permutations as possible outputs. Some embodiments may use a recommended probability ½ Boolean generator to compare two text-based full-range permutation polynomial encoded values.

Such sorting networks permute in a biased fashion, that is, some permutations are more probable than others, since the number of swap configurations is $2^{number\ of\ stages}$. However, the permutation count is equal to the number of elements to permute, which does not evenly divide the number of swap-configurations. In spite of the biased output, the advantage is simplicity and high dependency count with non-T functionality.

Unbiased Permutations Via Simple Selection

In some embodiments, unbiased permutations can also be generated by selecting a $1^{st}$ element at random by taking the $r_1$ mod n element among the elements (zero origin), selecting $2^{nd}$ element at random by taking the $r_2$ mod(n−1) element at random from the remaining elements, and the like. With this process each $r_i$ is a full range text-based perm-poly value. This may provide almost perfectly bias-free and non-T-function. However, operations may be harder to hide in or interleave with ordinary code than for sorting-network-based permutation.

Hobbling Bit-Slice Analysis

As explained above, bit-slice attacks are a common attack tool: repeatedly executing a function and ignoring all but the lowest-order bit, and then the lowest-order two bits, the three lowest-order bits, etc. This allows the attacker to gain information until the full word size (say 32 bits) is reached, at which point complete information has been obtained on how the function behaves.

A function constructed using T-function and non-T-function components has subdomains over which it is a T-function embedded in an entire domain in which the function is not. In some embodiment it may be advantageous to make the number of such subdomains very large (for example, in a Mark III type system as described herein, there may be over $10^{40}$ such subdomains) to make bucketing attacks on the subdomains highly resource-intensive. In some embodiments, liberal use also may be made of non-T-function computations at other points, such as at decision points, in permutations, in recodings, and the like.

An Example General Data Blending Mechanism

Figure 24:
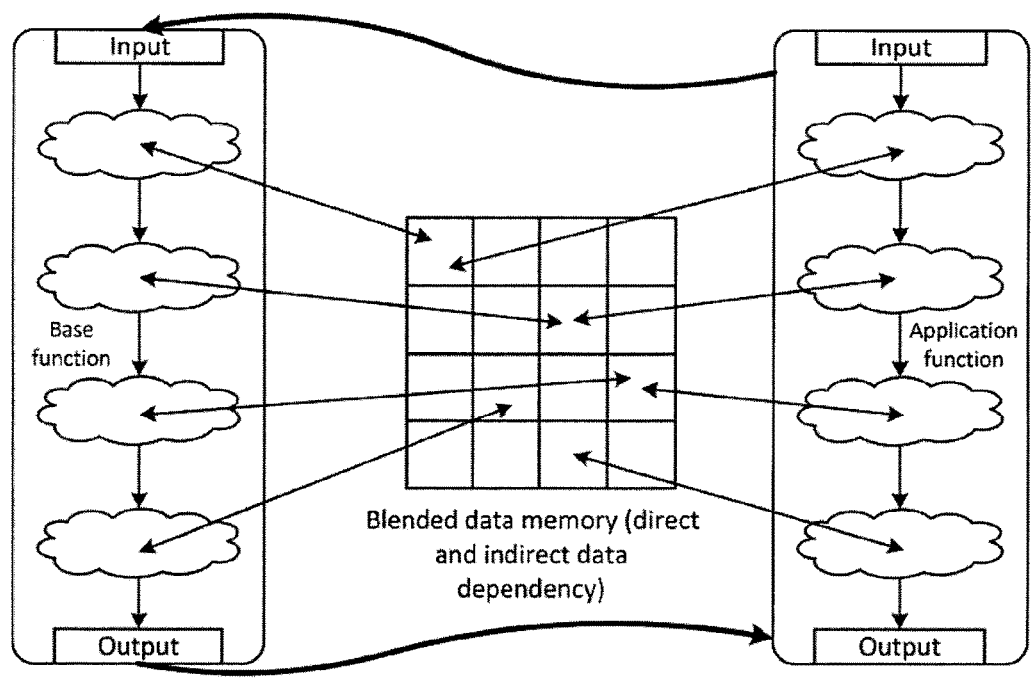
FIG. 24 shows a graphical representation of a typical usage of Mass Data Encoding or Dynamic Data Mangling in an implementation of the invention.

FIG. 24 shows a graphical representation of a typical usage of Mass Data Encoding or Dynamic Data Mangling as described above. If inputs to a base function are provided by such an obscured memory array, by either of these two techniques, and the results are also obtained by the application from the obscured memory array, it becomes difficult for an attacker to analyse the data-flow of information entering or leaving the base function, making attacks on the base function more arduous.

Security-Refresh Rate

For effective application security lifecycle management, applications typically must be capable of resisting attacks on an ongoing basis. As part of this resistance, such applications may be configured to self-upgrade in response to security-refresh messages containing security renewal information. Such upgrades may involve patch files, table replacements, new cryptographic keys, and other security-related information.

A viable level of security is one in which application security is refreshed frequently enough so that the time taken to compromise an instance's security is longer than the time to the security-refresh which invalidates the compromise; i.e., instances are refreshed faster than they can typically be broken. This is certainly achievable at very high security-refresh rates. However, such frequent refresh actions consume bandwidth, and as we raise the refresh rate, the proportion of bandwidth allocated to security-refresh messages increases, and available non-security payload bandwidth decreases.

Plainly, then, engineering the appropriate security-refresh rate is required for each kind of application, since the tolerable overheads vary greatly depending on context. For example, if we expect only gray-box attacks (neighbor side-channel attacks) in a cloud application, we would use a lower refresh rate than if we expected white-box attacks (insider attacks by malicious cloud-provider staff).

Authentication of Equality with Chaotic Failure

Suppose we have an application in which authentication is password-like: authentication succeeds where G, the supplied value, matches a reference value Γ; i.e., when G=Γ. Further suppose that we care about what happens when G=Γ, but if not, we only insist that whatever the authentication authorized is no longer feasible. That is, we succeed when G=Γ, but if G≠Γ, further computation may simply fail.

The authenticating equality is not affected by applying any non-lossy function to both sides: for any bijection φ, we can equivalently test whether φ(φ)=φ(Γ). The authenticating equality may remain valid with high probability even if φ is lossy, if φ is carefully chosen so that the probability that φ(G)=φ(Γ) when G≠Γ is sufficiently low (as it is in Unix password authentication, for example). Based on technology previously described herein, we can easily perform such a test. We previously described a method for foiling tampering by duplicating data-flow, randomly cross connecting the data-flow between duplicate instances, and performing encoded checking to ensure that the equalities have not been compromised. We can adapt this approach to test whether G=Γ, or in encoded form, whether φ(G)=φ(Γ).

We note that a data-flow yielding φ(G) already duplicates a dataflow yielding φ(Γ) along the success path where G=Γ. We therefore omit, for this comparison, the data-flow duplication step. Then we simply cross-connect as described above and insert checks. By using these computations as coefficients for future encoded computations, we ensure that, if φ(G)=φ(Γ), all will proceed normally, but if φ(G)≠φ(Γ), while further computation will proceed, the results will be chaotic and its functionality will fail. Moreover, since φ is a function, if φ(G)≠φ(Γ), we can be sure that G≠Γ.

Variable-Dependent Coding

In some embodiments that incorporate operations which make use of one or more variables which need not have a specific value during their use in the operation, variable-dependent coding may be used to further obscure the operation of related code. One way of doing so is to use values that are used or generated by other operations in nearby or related sections of code. Thus, such values may be used repeatedly for different purposes within a region of code, which may make it more difficult for an attacker to discern any individual use, or to extract information about the specific operations being performed in relation to those values. For example, if a value x is encoded as aX+b, there may be a great deal of leeway in the specific values used for the constants a and b. In this example, if there are values available within the executing code that remain constant over the life of x, they may be used as one or more of the constants a and/or b.

Further, for a single defined operation, different values may be used during each execution of the operation, such that the specific values used may change each time the operation is executed. This may act as an additional barrier to a potential attacker, who may not be able to track values from one execution to another as might be expected for other types of clear, encrypted, or obfuscated code. Continuing the example above, a first operation f(Y) may return values a and b and a second operation g(Z) may return values c and d, each of which is stored in memory for a period of time. The variable x may be encoded during the time that a and b are stored in memory as aX+b, and as cX+d during the time that c and d are stored in memory. Thus, the appropriate constants will be available via the memory to allow for decoding or otherwise manipulating x in the appropriate encoding. The values may be overwritten or discarded after that time, since the encoding constants need only be available during the time that x is used by operations within the executing program.

Similarly, variable values generated during execution of code may be used for other purposes in addition to or as an alternative to the finite encoding example provided. For example, variable values may be used to select a random item from a list or index, as a seed for a pseudo-random number generator, as an additive, multiplicative, or other scaling factor, or the like. More generally, variable values generated by one portion of executed code may be used in any place where a constant value is needed at another portion of executed code, for a duration not more than the generated variable values are expected to be available.

Example Advantages

Embodiments of the invention described herein may be used to provide the following, where a "sufficient period of time" may be selected based on, or otherwise determined by, the needs of security lifecycle management:

1) Black-Box Security: security as a keyed black-box cipher against attacks up to adaptive known plaintext for a sufficient period of time;
2) Secure Boundary: securely pass information in and out to/from surrounding code in encoded form for a sufficient period of time;
3) Key-Hiding: prevent key-extraction from implementations for a sufficient period of time;
4) Secure Weakest-Path: cryptographically secure even on weakest data path for a sufficient period of time;
5) Anti-Partitioning: partition implementation into its construction blocks for a sufficient period of time;
6) Application-Locking: cannot extract implementation from its containing application for a sufficient period of time; and
7) Node-Locking: cannot extract implementation from its host platform for a sufficient period of time.

Generally, embodiments disclosed herein relate to base-function encoding, using various techniques and systems as disclosed. Specific embodiments also may be referred to herein, such as in the Appendix, as "ClearBox" implementations.

The various techniques as disclosed herein may use operations that are similar in nature to those used in an application that is being protected by the disclosed techniques, as previously described. That is, the protection techniques such as base functions, fractures, dynamic data mangling, cross-linking, and variable dependent coding may use operations that are similar to those used by the original application code, such that it may be difficult or impossible for a potential attacker to distinguish between the original application code and the protective measures disclosed herein. As a specific example, base functions may be constructed using operations that are the same as, or computationally similar to, the operations performed by the original application code with which the base functions are integrated, in contrast to the distinctive functions typically employed by, for example, known encryption techniques. Such operations and techniques that are difficult or impossible to distinguish may be described herein as "computationally similar."

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

Embodiments disclosed herein may be implemented in and used with a variety of computer systems and architectures. FIG. 32 is an example computer system 3200 suitable for implementing embodiments disclosed herein. The computer 3200 may include a communication bus 3201 which interconnects major components of the system, such as a central processor 3210; a fixed storage 3240, such as a hard drive, flash storage, SAN device, or the like; a memory 3220; an input/output module 3230, such as a display screen connected via a display adapter, and/or one or more controllers and associated user input devices such as a keyboard, mouse, and the like; and a network interface 3250, such as an Ethernet or similar interface to allow communication with one or more other computer systems.

As will be readily understood by one of skill in the art, the bus 3201 allows data communication between the central processor 3210 other components. Applications resident with the computer 3200 generally may be stored on and accessed via a computer readable medium, such as the storage 3240 or other local or remote storage device. Generally, each module shown may be integral with the computer or may be separate and accessed through other interfaces. For example, the storage 3240 may be local storage such as a hard drive, or remote storage such as a network-attached storage device.

Many other devices or components may be connected in a similar manner. Conversely, all of the components shown need not be present to practice embodiments disclosed herein. The components can be interconnected in different ways from that shown. The operation of a computer such as that shown is readily known in the art and is not discussed in detail in this application. Code to implement embodiments of the present disclosure may be stored in a computer-readable storage medium such as one or more of the memory 3220, the storage 3240, or combinations thereof.

More generally, various embodiments disclosed herein may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium. When such computer program code is loaded into and executed by a computer, the computer may become an apparatus for practicing embodiments disclosed herein. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments disclosed herein. When implemented on a general-purpose processor, the computer program code may configure the processor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware.

In some embodiments, the various features and functions disclosed herein may be implemented by one or more modules within a computer system, and/or within software executed by the computer system. For example, a computer system according to some embodiments disclosed herein may include one or more modules configured to receive existing computer executable code, to modify the code as disclosed herein, and to output the modified code. Each module may include one or more sub-modules, such as where a module configured to modify existing computer executable code includes one or more modules to generate base functions, blend the base functions with the code, and output the blended code. Similarly, other modules may be used to implement other functions disclosed herein. Each module may be configured to perform a single function, or a module may perform multiple functions. Similarly, each function may be implemented by one or more modules operating individually or in coordination.

One or more currently preferred embodiments have been described by way of example. It will be apparent to persons skilled in the art that a number of variations and modifications can be made without departing from the scope of the invention as defined in the claims.

The invention claimed is:

1. A method, implemented by one or more processors, for creating a secured software program from an existing computer-executable program, the method comprising:
selecting a word size w;
selecting a vector length N;
generating an invertible state-vector function configured to operate on an N-vector of w-element words, the invertible state-vector function comprising a concatenation of a plurality of invertible steps, wherein one or more steps of the plurality of invertible steps perform linear or affine computations over $Z/(2^w)$;
indexing a first portion of steps of the plurality of invertible steps using a first indexing technique;
indexing a second portion of steps of the plurality of invertible steps using a second indexing technique;
selecting at least one operation in an existing computer-executable program to modify; and
modifying the at least one operation in the existing computer-executable program to execute the state-vector function.

2. The method of claim 1, wherein each of the first and second indexing techniques controls an operation type independently selected from the group consisting of: an if-then-else construct; a switch construct, an element-permutation selection, an iteration count, an element rotation count, and a function-indexed key index.

3. The method of claim 1, wherein each step in a third portion of steps of the plurality of invertible steps comprises a non-T-function operation.

4. The method of claim 3, wherein each of the steps in the third portion of steps is an operation type selected from the group consisting of: a function-indexed keyed element-wise rotation, and a function-indexed keyed sub-vector permutation.

5. The method of claim 1, wherein w is selected from the group consisting of: 16 bits, 32 bits, and 64 bits.

6. The method of claim 1, wherein w is selected as a default integer size of a host computing platform.

7. The method of claim 1, wherein the word size w is twice the internal word size of the N-vector.

8. The method of claim 1, further comprising:
generating an inverse of the invertible state-vector function, the inverse of the invertible state-vector function comprising a concatenation of an inverse of each of the plurality of invertible steps.

9. The method of claim 1, further comprising:
selecting a key type for the invertible state-vector function from the group consisting of: a run-time key, a generation-time key, and a function-indexed key.

10. The method of claim 9, wherein the selected key type is a run-time key, said method further comprising:
modifying the state-vector function to accept a run-time input providing a key k.

11. The method of claim 9, wherein the selected key type is a generation-time key, said method further comprising partially evaluating the state-vector function with respect to a key K.

12. The method of claim 9, wherein the selected key type is a function-indexed key, said method further comprising, for each of the plurality of invertible steps A, providing a key $R_A$ for the associated inverse of the invertible step.

13. The method of claim 1, wherein the state-vector function is implemented at least in part by a plurality of matrix operations.

14. The method of claim 1, wherein at least one of the first and second indexing techniques controls a plurality of operations comprising random swaps performed according to a sorting-network topology.

15. The method of claim 14, wherein the sorting-network topology is selected from the group consisting of: a Batcher network, a Banyan network, a perfect-shuffle network, and an Omega network.

16. The method of claim 1, further comprising:
encoding an input to the state-vector function with a first encoding mechanism; wherein each step in the state-vector function is adapted and configured to operate when the input to the state-vector function encoded with a second encoding mechanism different from the first encoding mechanism.

17. The method of claim 16, wherein the first encoding mechanism encodes the input as aM+b, wherein a and b are constants and wherein M is an invertible matrix.

18. The method of claim 17, wherein the second encoding mechanism, when applied to the input, encodes the input as cP+d, wherein c and d are constants different than a and b, respectively and wherein P is an invertible Matrix.

19. The method of claim 1, wherein the at least one operation in the existing computer-executable program and the state-vector function use computationally-similar operations.

20. The method of claim 1, wherein the step of modifying the existing computer program further comprises applying, to a combination of the state-vector function and the existing computer program, at least one technique selected from the group consisting of: a fracture, and dynamic data mangling.

21. The method of claim 20, wherein each of the state-vector function and code implementing the at least one technique uses operations computationally similar to those present in the existing computer program.

* * * * *